(12) United States Patent  (10) Patent No.: US 7,499,040 B2
Zadesky et al.  (45) Date of Patent: Mar. 3, 2009

(54) MOVABLE TOUCH PAD WITH ADDED FUNCTIONALITY

(75) Inventors: Stephen Paul Zadesky, San Carlos, CA (US); Stephen Brian Lynch, Alamo, CA (US); Brett William Degner, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 10/643,256

(22) Filed: Aug. 18, 2003

(65) Prior Publication Data

US 2005/0052425 A1 Mar. 10, 2005

(51) Int. Cl.
G06F 3/041 (2006.01)
G06F 3/038 (2006.01)

(52) U.S. Cl. .................. 345/204; 345/173
(58) Field of Classification Search ......... 345/173–178, 345/168, 169; 178/18.03–18.11
See application file for complete search history.

(56) References Cited

U.S. PATENT DOCUMENTS

| 1,061,578 | A | 5/1913 | Wischhusen et al. |
| 2,798,907 | A | 7/1957 | Schneider |
| 2,903,229 | A | 9/1959 | Landge |
| 2,945,111 | A | 9/1960 | McCormick |
| 3,005,055 | A | 10/1961 | Mattke |
| 3,965,399 | A | 6/1976 | Walker et al. |
| 4,103,252 | A | 7/1978 | Bobick |
| 4,110,749 | A | 8/1978 | Janko et al. |
| 4,115,670 | A | 9/1978 | Chandler |
| 4,121,204 | A | 10/1978 | Welch et al. |
| 4,129,747 | A | 12/1978 | Pepper |
| 4,158,216 | A | 6/1979 | Bigelow |
| 4,242,676 | A | 12/1980 | Piguet et al. |
| 4,246,452 | A | 1/1981 | Chandler |
| 4,264,903 | A | 4/1981 | Bigelow |
| 4,293,734 | A | 10/1981 | Peper, Jr. |
| D264,969 | S | 6/1982 | McGourty |
| 4,380,007 | A | 4/1983 | Steinegger |
| 4,380,040 | A | 4/1983 | Posset |
| 4,475,008 | A | 10/1984 | Doi et al. |
| 4,570,149 | A | 2/1986 | Thornburg et al. |
| 4,587,378 | A | 5/1986 | Moore |
| 4,644,100 | A | 2/1987 | Brenner et al. |

(Continued)

FOREIGN PATENT DOCUMENTS

CN 1139235 A 1/1997

(Continued)

OTHER PUBLICATIONS

"About Quicktip®" www.logicad3d.com/docs/qt.html, downloaded Apr. 8, 2002.

(Continued)

*Primary Examiner*—Jimmy H Nguyen
(74) *Attorney, Agent, or Firm*—Morrison & Foerster LLP

(57) ABSTRACT

An input device is disclosed. The input device includes a movable touch pad capable of detecting an object in close proximity thereto so as to generate a first control signal. The input device also includes a movement indicator capable of detecting the movements of the movable touch pad so as to generate one or more distinct second control signals. The control signals being used to perform actions in an electronic device operatively coupled to the input device.

29 Claims, 11 Drawing Sheets

U.S. PATENT DOCUMENTS

| | | |
|---|---|---|
| 4,719,524 A | 1/1988 | Morishima et al. |
| 4,734,034 A | 3/1988 | Maness et al. |
| 4,736,191 A * | 4/1988 | Matzke et al. ................. 341/20 |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,798,919 A | 1/1989 | Miessler et al. |
| 4,810,992 A | 3/1989 | Eventoff |
| 4,831,359 A | 5/1989 | Newell |
| 4,849,852 A | 7/1989 | Mullins |
| 4,856,993 A | 8/1989 | Maness et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,951,036 A | 8/1990 | Grueter et al. |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,495,566 A | 2/1996 | Kwatinetz |
| 5,508,703 A | 4/1996 | Okamura et al. |
| 5,543,588 A | 8/1996 | Bisset et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,893 A | 12/1996 | Gaughan et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| D382,550 S | 8/1997 | Kaneko et al. |
| 5,657,012 A | 8/1997 | Tart |
| 5,661,632 A | 8/1997 | Register |
| D385,542 S | 10/1997 | Kaneko et al. |
| 5,689,285 A | 11/1997 | Asher |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,805,144 A | 9/1998 | Scholder et al. |
| 5,808,602 A | 9/1998 | Sellers |
| 5,812,498 A | 9/1998 | Terés |
| 5,825,353 A | 10/1998 | Will |
| 5,828,364 A | 10/1998 | Siddiqui |
| 5,838,304 A | 11/1998 | Hall |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,822 A | 1/1999 | Du et al. |
| 5,859,629 A | 1/1999 | Tognazzini |
| 5,875,311 A | 2/1999 | Bertram et al. |
| 5,883,619 A | 3/1999 | Hoe et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dändliker et al. |
| 5,907,318 A | 5/1999 | Medina |
| 5,909,211 A | 6/1999 | Combs et al. |
| 5,914,706 A | 6/1999 | Kono |
| 5,923,388 A | 7/1999 | Kurashima et al. |
| D412,940 S | 8/1999 | Kato et al. |
| 5,943,044 A | 8/1999 | Martinelli et al. |
| 5,956,019 A | 9/1999 | Bang et al. |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,389 A | 12/1999 | Kasser |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,122,526 A | 9/2000 | Parulski et al. |
| 6,124,587 A | 9/2000 | Bidiville et al. |
| 6,128,006 A | 10/2000 | Rosenberg et al. |
| 6,163,312 A | 12/2000 | Furuya |
| 6,166,721 A | 12/2000 | Kuroiwa et al. |
| 6,179,496 B1 | 1/2001 | Cho |
| 6,181,322 B1 | 1/2001 | Nanavati |
| D437,860 S | 2/2001 | Suzuki et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |

| | | |
|---|---|---|
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,248,017 B1 | 6/2001 | Roach |
| 6,254,477 B1 | 7/2001 | Sasaki et al. |
| 6,256,011 B1 | 7/2001 | Culver |
| 6,262,717 B1 | 7/2001 | Donohue et al. |
| 6,262,785 B1 | 7/2001 | Kim |
| 6,266,050 B1 | 7/2001 | Oh et al. |
| D448,810 S | 10/2001 | Goto |
| 6,297,795 B1 | 10/2001 | Kato et al. |
| 6,297,811 B1 | 10/2001 | Kent et al. |
| D450,713 S | 11/2001 | Masamitsu et al. |
| 6,314,483 B1 | 11/2001 | Goto et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,473,069 B1 | 10/2002 | Gerphelde |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,587,091 B2 | 7/2003 | Serpa |
| 6,606,244 B1 | 8/2003 | Liu et al. |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,664,951 B1 | 12/2003 | Fujii et al. |
| 6,677,927 B1 | 1/2004 | Bruck et al. |
| 6,686,904 B1 | 2/2004 | Sherman et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,788,288 B2 * | 9/2004 | Ano .................. 345/157 |
| 6,791,533 B2 | 9/2004 | Su |
| 6,795,057 B2 | 9/2004 | Gordon |
| 6,844,872 B1 | 1/2005 | Farag et al. |
| 6,886,842 B2 | 5/2005 | Vey et al. |
| 6,894,916 B2 | 5/2005 | Reohr et al. |
| 6,922,189 B2 | 7/2005 | Fujiyoshi |
| 6,930,494 B2 | 8/2005 | Tesdahl et al. |
| 6,977,808 B2 | 12/2005 | Lam et al. |
| 6,978,127 B1 | 12/2005 | Bulthuis et al. |
| 7,006,077 B1 | 2/2006 | Uusimäki |
| 7,046,230 B2 * | 5/2006 | Zadesky et al. ............ 345/156 |
| 7,069,044 B2 | 6/2006 | Okada et al. |
| 7,084,856 B2 | 8/2006 | Huppi |
| 7,113,196 B2 | 9/2006 | Kerr |
| 7,113,520 B1 | 9/2006 | Meenan |
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 2001/0011991 A1 | 8/2001 | Wang et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0045960 A1 | 4/2002 | Phillips et al. |
| 2002/0071550 A1 | 6/2002 | Pletikosa |
| 2002/0089545 A1 | 7/2002 | Montalcini |
| 2002/0118131 A1 | 8/2002 | Yates et al. |
| 2002/0118169 A1 | 8/2002 | Hinckley et al. |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0180701 A1 | 12/2002 | Hayama et al. |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0184517 A1 | 10/2003 | Senzui et al. |
| 2003/0206202 A1 | 11/2003 | Moriya |
| 2004/0156192 A1 | 8/2004 | Kerr et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 * | 12/2004 | Trent et al. .................. 345/174 |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0030048 A1 | 2/2005 | Bolender |
| 2005/0052425 A1 | 3/2005 | Zadesky et al. |
| 2005/0204309 A1 | 9/2005 | Szeto |
| 2006/0026521 A1 | 2/2006 | Hotelling et al. |
| 2006/0097991 A1 | 5/2006 | Hotelling et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0250377 A1 | 11/2006 | Zadesky et al. |
| 2006/0274905 A1 | 12/2006 | Lindahl et al. |
| 2007/0013671 A1 | 1/2007 | Zadesky et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0083822 A1 | 4/2007 | Robbin et al. |
| 2007/0085841 A1 | 4/2007 | Tsuk et al. |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0242057 A1 | 10/2007 | Zadesky et al. |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036734 A1 | 2/2008 | Forsblad et al. |
| 2008/0087476 A1 | 4/2008 | Prest |
| 2008/0088582 A1 | 4/2008 | Prest |
| 2008/0088596 A1 | 4/2008 | Prest |

| | | | | | | |
|---|---|---|---|---|---|---|
| 2008/0088597 | A1 | 4/2008 | Prest | JP | 6-139879 | 5/1994 |
| 2008/0088600 | A1 | 4/2008 | Prest | JP | 06-187078 | 7/1994 |
| 2008/0111795 | A1 | 5/2008 | Bollinger | JP | 06-208433 | 7/1994 |

FOREIGN PATENT DOCUMENTS

| | | | | | |
|---|---|---|---|---|---|
| CN | 1455615 | 11/2003 | JP | 6-267382 | 9/1994 |
| CN | 1499356 | 5/2004 | JP | 06-283993 | 10/1994 |
| DE | 3615742 | 11/1987 | JP | 6-333459 | 12/1994 |
| DE | 19722636 | 12/1998 | JP | 7-107574 | 4/1995 |
| DE | 10022537 | 11/2000 | JP | 07-107574 | 4/1995 |
| DE | 20019074 U1 | 2/2001 | JP | 7-41882 | 7/1995 |
| EP | 0178157 | 4/1986 | JP | 07-41882 | 7/1995 |
| EP | 0419145 A1 | 3/1991 | JP | 7-201249 | 8/1995 |
| EP | 0 498 540 A2 | 1/1992 | JP | 07-201256 | 8/1995 |
| EP | 0521683 A2 | 1/1993 | JP | 07-253838 | 10/1995 |
| EP | 0674288 A1 | 9/1995 | JP | 7-261899 | 10/1995 |
| EP | 0 731 407 A1 | 9/1996 | JP | 07-261899 | 10/1995 |
| EP | 0 551 778 B1 | 1/1997 | JP | 7-261922 | 10/1995 |
| EP | 0551778 B1 | 1/1997 | JP | 07-296670 | 11/1995 |
| EP | 0 880 091 A2 | 11/1998 | JP | 7-319001 | 12/1995 |
| EP | 026 713 A1 | 8/2000 | JP | 08-016292 | 1/1996 |
| EP | 1 081 922 A2 | 3/2001 | JP | 08-115158 | 5/1996 |
| EP | 1098241 A2 | 5/2001 | JP | 8-115158 | 5/1996 |
| EP | 1 133 057 | 9/2001 | JP | 8-203387 | 8/1996 |
| EP | 1162826 A2 | 12/2001 | JP | 8-293226 | 11/1996 |
| EP | 1205836 A2 | 5/2002 | JP | 8-298045 | 11/1996 |
| EP | 1251455 A2 | 10/2002 | JP | 08-299541 | 11/1996 |
| EP | 1 467 392 | 10/2004 | JP | 8-316664 | 11/1996 |
| EP | 1482401 A2 | 12/2004 | JP | 09-044289 | 2/1997 |
| EP | 1 496 467 | 1/2005 | JP | 09-069023 | 3/1997 |
| EP | 1542437 A2 | 6/2005 | JP | 09-128148 | 5/1997 |
| EP | 1 589 407 | 10/2005 | JP | 9-134248 | 5/1997 |
| FR | 2 686 440 A1 | 7/1993 | JP | 9-218747 | 8/1997 |
| GB | 2015167 | 9/1979 | JP | 09-230993 | 9/1997 |
| GB | 2072389 | 9/1981 | JP | 9-230993 | 9/1997 |
| GB | 2315186 | 1/1998 | JP | 9-231858 | 9/1997 |
| GB | 2391060 | 1/2004 | JP | 09-233161 | 9/1997 |
| GB | 2402105 A | 12/2004 | JP | 9-251347 | 9/1997 |
| JP | 55-174009 | 6/1982 | JP | 9-258895 | 10/1997 |
| JP | 57-95722 | 6/1982 | JP | 9-288926 | 11/1997 |
| JP | 61-117619 | 6/1986 | JP | 10-74127 | 3/1998 |
| JP | 61-124009 | 6/1986 | JP | 10-074429 | 3/1998 |
| JP | 61-164547 | 1/1988 | JP | 10-198507 | 7/1998 |
| JP | 63-106826 | 5/1988 | JP | 10-227878 | 8/1998 |
| JP | 63-181022 | 7/1988 | JP | 10-326149 | 12/1998 |
| JP | 63-298518 | 12/1988 | JP | 11-24834 | 1/1999 |
| JP | 03-57617 | 6/1991 | JP | 10-012010 | 7/1999 |
| JP | 3-192418 | 8/1991 | JP | 10-012025 | 7/1999 |
| JP | 04-32920 | 2/1992 | JP | 10-012026 | 7/1999 |
| JP | 5-041135 | 2/1993 | JP | 10-012027 | 7/1999 |
| JP | 5-080938 | 4/1993 | JP | 10-012028 | 7/1999 |
| JP | 5-101741 | 4/1993 | JP | 10-012029 | 7/1999 |
| JP | 05-36623 | 5/1993 | JP | 11-184607 | 7/1999 |
| JP | 5-189110 | 7/1993 | JP | 11-194863 | 7/1999 |
| JP | 5-205565 | 8/1993 | JP | 11-194872 | 7/1999 |
| JP | 5-211021 | 8/1993 | JP | 11-194883 | 7/1999 |
| JP | 5-217464 | 8/1993 | JP | 11-203045 | 7/1999 |
| JP | 05-233141 | 9/1993 | JP | 11-212725 | 8/1999 |
| JP | 05-262276 | 10/1993 | JP | 10-089535 | 10/1999 |
| JP | 5-265656 | 10/1993 | JP | 2000-215549 | 8/2000 |
| JP | 5-274956 | 10/1993 | JP | 2000-267786 | 9/2000 |
| JP | 05-289811 | 11/1993 | JP | 2000-353045 | 12/2000 |
| JP | 5-298955 | 11/1993 | JP | 2001-11769 | 1/2001 |
| JP | 5-325723 | 12/1993 | JP | 2001-22508 | 1/2001 |
| JP | 06-20570 | 1/1994 | JP | 3085481 | 2/2002 |
| JP | 6-084428 | 3/1994 | JP | 2002-215311 | 8/2002 |
| JP | 6-089636 | 3/1994 | JP | 2003-280807 | 10/2003 |
| JP | 06-096639 | 4/1994 | JP | 2005-99635 | 9/2005 |
| JP | 6-96639 | 4/1994 | JP | 2005-133824 | 10/2005 |
| JP | 06-111685 | 4/1994 | JP | 2005-134953 | 10/2005 |
| JP | 06-111695 | 4/1994 | JP | 2005-235579 | 1/2006 |
| JP | 6-111695 | 4/1994 | JP | 2005-358970 | 7/2006 |
| | | | JP | 3852854 | 9/2006 |
| | | | JP | 3852854 | 12/2006 |
| | | | JP | 2005-312433 | 5/2007 |

| | | |
|---|---|---|
| KR | 1998-71394 | 10/1998 |
| KR | 1999-50198 | 7/1999 |
| KR | 2000-08579 | 2/2000 |
| KR | 2001-0052016 | 6/2001 |
| TW | 431607 | 4/2001 |
| TW | 547716 | 8/2003 |
| TW | 00470193 | 12/2003 |
| TW | I220491 | 8/2004 |
| WO | 94/17494 | 8/1994 |
| WO | WO 95/00897 A1 | 1/1995 |
| WO | 98/14863 | 4/1998 |
| WO | 99/49443 | 9/1999 |
| WO | WO-03/044645 A1 | 5/2003 |
| WO | WO 03/044956 | 5/2003 |
| WO | WO 03/088176 | 10/2003 |
| WO | WO 03/090008 | 10/2003 |
| WO | WO 2004/040606 | 5/2004 |
| WO | WO-2005/055620 A2 | 6/2005 |
| WO | WO 2005/076117 | 8/2005 |
| WO | WO-2005/124526 A2 | 12/2005 |
| WO | WO 2006/037545 | 4/2006 |
| WO | WO 2006/104745 | 10/2006 |
| WO | WO 2007/025858 | 3/2007 |

OTHER PUBLICATIONS

"Der Klangmeister," Connect Magazine, Aug. 1998.
"Neuros MP3 Digital Audio Computer", www.neurosaudio.com., downloaded Apr. 9, 2003.
"OEM Touchpad Modules" website www.glidepoint.com/sales/modules.index.shtml, downloaded Feb. 13, 2002.
"Product Overview—ErgoCommander®", www.logicad3d.com/products/ErgoCommander.htm, downloaded Apr. 8, 2002.
"Product Overview—SpaceMouse® Classic", www.logicad3d.com/products/Classic.htm, downloaded Apr. 8, 2002.
"Synaptics Touch Pad Interfacing Guide" Second Edition, Mar. 25, 1998, Synaptics, Inc. San Jose, CA, pp. 1 to 90.
Bang & Olufsen Telecom a/s, "BeoCom 6000 User Guide 2000".
BeoCom 6000, Sales Training Brochure, date unknown.
Chapweske, Adam, "PS/2 Mouse/Keyboard Protocol", 1999, http://panda.cs.ndsu.nodak.edu/~achapwes/PICmicro/PS2/ps2.htm.
Fiore, Andrew, "Zen Touchpad", Cornell University, May 2000.
Gadgetboy, "Point and click with the latest mice", CNET Asia Product Review, www.asia.cnet.com/reviews...are/gadgetboy/0,39001770,38023590,00.htm, downloaded Dec. 5, 2001.
Kevin De Meyer, Crystal Optical Mouse, Feb. 14, 2002, Heatseekerz, Web Article 19.
Letter re: Bang & Olufsen A/S, by David Safran, Nixon Peabody, LLP, May 21, 2004.
Photographs of Innovations 2000 Best of Show award presented at the 2000 International CES Innovations 2000 Design & Engineering Showcase, 1 pg.
Sylvania, "Intellivision™ Intelligent Television Master Component Service Manual," pp. 1, 2 and 8, 1979.
Tessler et al. "Touchpads Three new input devices", website www.macworld.com/1996/02/review/1806.html, download Feb. 13, 2002.
Andre et al., entitled "Media Device," U.S. Appl. No. 29/180,558, filed Apr. 25, 2003.
Marriott et al., entitled "Touch Pad for Hand Held Device", U.S. Appl. No. 10/722,948, filed Nov. 25, 2003.
Andre et al., "Media Device", U.S. Appl. No. 29/212,343, field Aug. 31, 2004.
Supplementary European Search Report dated Mar. 8, 2007 from European Patent Application No. 04780307.7 (3 pages).
Chinese Office Action issue Dec. 29, 2006, directed to CN Application No. 200510103886.3, 25 pages.
"Apple Presents iPod: Ultra-Portable MP3 Music Player Puts 1,000 Songs in Your Pocket," retrieved from http://www.apple.com/pr/library/2001/oct/23ipod.html on Oct. 23, 2001.
"Apple Unveils Optical Mouse and New Pro Keyboard," Press Release, Jul. 19, 2000.
"OEM Touchpad Modules" website www.glidepoint.com/sales/modules.index.shmtl, downloaded Feb. 13, 2002.
"System Service and Troubleshooting Manual," www.dsplib.com/intv/Master, downloaded Dec. 11, 2002.
Bray, "Phosphors help switch on xenon," Physics in Action, pp. 1-3, Apr. 1999.
EVB Elektronik "TSOP6238 IR Receiver Modules for Infrared Remote Control Systems" dated Jan. 2004 1 page.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Luna Technologies International, Inc., LUNA Photoluminescent Safety Products, "Photoluminescence-What is Photoluminescence?" from website at http://www.lunaplast.com/photoluminescence.com on Dec. 27, 2005.
Ahmad, "A Usable Real-Time 3D Hand Tracker," Proceedings of the 28th Asilomar Conference on Signals, Systems and Computers—Part 2 (of 2) vol. 2 (Oct. 1994), 5 pages.
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," *Computer Huamn Interaction*: 16 pages.
Kobayashi et al. "Development of the Touch Switches with the Click Response," Koukuu Denshi Gihou No. 17: pp. 44-48 (1994-3) (published by the Japan Aviation Electronics Industry, Ltd.); Translation of Summary.
"Atari VCS/2600 Peripherals", www.classicgaming.com, downloaded Feb. 28, 2007, pp. 1-15.
"Alps Electric introduces the GlidePoint Wave Keyboard; combines a gently curved design with Alps' advanced GlidePoint Technology", Business Wire, (Oct. 21, 1996).
Alps Electric Ships GlidePoint Keyboard for the Macintosh; Includes a GlidePoint Touchpad, Erase-Eaze Backspace Key and Contoured Wrist Rest, Business Wire, (Jul. 1, 1996).
"APS show guide to exhibitors", Physics Today, 49(3) (Mar. 1996).
"Design News literature plus", Design News, 51(24), (Dec. 18, 1995).
"Manufactures", Laser Focus World, Buyers Guide '96, 31(12) (Dec. 1995).
"National Design Engineering Show", Design News, 52(5) (Mar. 4, 1996).
"Preview of exhibitor booths at the Philadelphia show", Air Conditioning Heating & Refrigerator News, 200(2) (Jan. 13, 1997).
"Product news", Design News, 53(11) (Jun. 9, 1997).
"Product news", Design News, 53(9) (May 5, 1997).
Ahl, David, "Controller Updated", Creative Computing 9(12) (Dec. 1983).
Baig, E.C., "Your PC Might Just Need a Mouse", U.S. News and World Report, 108(22), (Jun. 4, (1990).
Bartimo, Jim, "The Portables: Traveling Quickly", Computerworld (Nov. 14, 1983).
Brink et al., "Pumped-up portables", U.S. News & World Report, 116(21) (May 30, 1994).
Brown et al., "Windows on Tablets as a Means of Achieving Virtual Input Devices", Human-Computer Interaction—Interact '90 (1990).
Buxton et al., "Issues and Techniques in Touch-Sensitive Tablet Input", Computer Graphics, 19(3), Proceedings of SIGGRAPH '85 (1985).
Chen et al., "A Study in Interactive 3-D Rotation Using 2-D Control Devices", Computer Graphics 22(4) (Aug. 1988).
Evans et al., "Tablet-based Valuators that Provide One, Two, or Three Degrees of Freedom", Computer Graphics 15(3) (Aug. 1981).
Jesitus, John, "Broken promises?", Industry Week/IW, 246(20) (Nov. 3, 1997).
Mims, Forrest M. III, "A Few Quick Pointers; Mouses, Touch Screens, Touch Pads, Light Pads, and the Like Can Make Your System Easier to Use", Computers and Electronics, 22, (May 1984).
Nass, Richard, "Touchpad input device goes digital to give portable systems a desktop "mouse-like" feel", Electronic Design, 44(18) (Sep. 3, 1996).
Perenson, Melissa, "New & Improved: Touchpad Redux", PC Magazine (Sep. 10, 1996).

Petersen, Marty, "Koalapad Touch Tablet & Micro Illustrator Software", InfoWorld, (Oct. 10, 1983).

Petruzzellis, "Force-Sensing Resistors" Electronics Now, 64(3), (Mar. 1993).

Soderholm, Lars D., "Sensing Systems for 'Touch and Feel'", Design News, (May 8, 1989).

Sony presents "Choice Without Compromise" at IBC '97 M2 Presswire (Jul. 24, 1997).

Spiwak, Marc, "A Great New Wireless Keyboard", Popular Electronics, 14(12) (Dec. 1997).

Spiwak, Marc, "A Pair of Unusual Controllers", Popular Electronics 14(4) (Apr. 1997).

Tessler, Franklin, "Point Pad", Macworld 12(10) (Oct. 1995).

Tessler, Franklin, "Smart Input: How to Chose from the New Generation of Innovative Input Devices," Macworld 13(5) (May 1996).

Tessler, Franklin, "Touchpads", Macworld 13(2) (Feb. 1996).

"Triax Custom Controllers Due; Video Game Controllers," HFD-The Weekly Home Furnishings Newspaper, 67(1), (Jan. 4, 1993).

"Touchpad," Notebook PC Manual, ACER Information Co. Ltd., Feb. 16, 2005, pp. 11-12.

Korean Office Action mailed Feb. 26, 2008, directed to counterpart KR Application No. 10-2006-7003255; 9 pages.

SanDisk Sansa Connect User Guide; 29 pages.

Translation of Trekstor's Defense Statement to the District Court Mannheim of May 23, 2008; 37 pages.

"Diamond Multimedia Announces Rio PMP300 Portable MP3 Music Player," located at http://news.harmony-central.com/Newp/1998/Rio-PMP300.html visited on May 5, 2008. (4 pages).

Japanese Office Action mailed Aug. 19, 2008, directed to counterpart JP Application No. 2006-523894; 4 pages.

International Search Report and Written Opinion, dated Dec. 6, 2007, directed to related International Application No. PCT/US2007/015501.

* cited by examiner

TRACKING SIGNAL

BUTTON SIGNAL

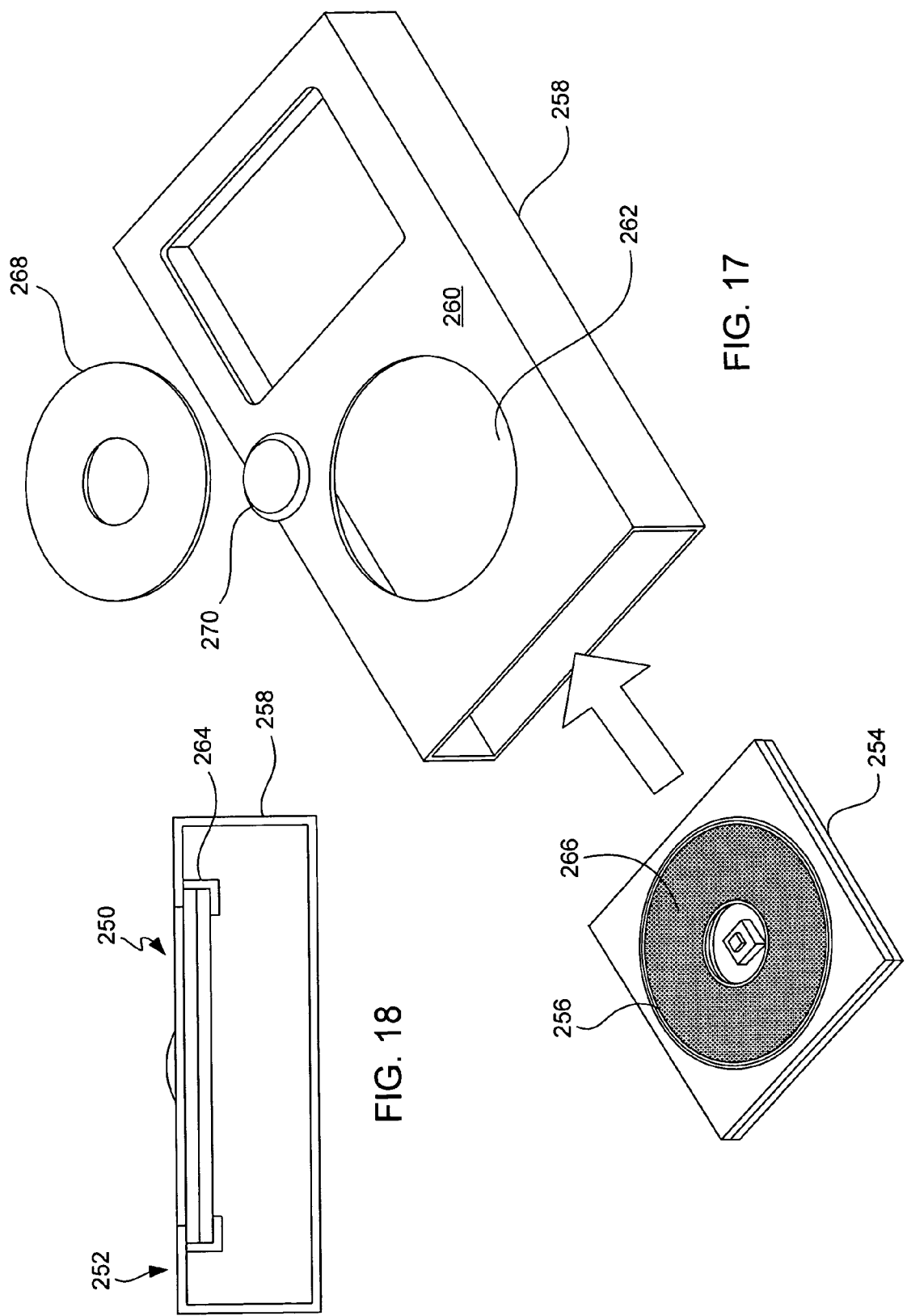

MOVABLE TOUCH PAD WITH ADDED FUNCTIONALITY

CROSS REFERENCE TO RELATED APPLICATION

BACKGROUND OF THE INVENTION

1. Field of the Invention

The present invention relates generally to touch pads. More particularly, the present invention relates to touch pads capable of moving in order to increase the functionality of the touch pad.

2. Description of the Related Art

There exist today many styles of input devices for performing operations in a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the consumer electronic device. In handheld computing devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, number, etc.). In the case of hand-held personal digital assistants (PDA), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases a dedicated portion of the touch pad may be tapped. In stationary devices such as desktop computers, the input devices are generally selected from mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackballs generally include one or more buttons for making selections on the display screen.

In addition to allowing input pointer movements and selections with respect to a GUI presented on a display screen, the input devices may also allow a user to scroll across the display screen in the horizontal or vertical directions. For example, mice may include a scroll wheel that allows a user to simply roll the scroll wheel forward or backward to perform a scroll action. In addition, touch pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

With regards to touch pads, mice and track balls, a Cartesian coordinate system is used to monitor the position of the finger, mouse and ball, respectively, as they are moved. The Cartesian coordinate system is generally defined as a two dimensional coordinate system (x, y) in which the coordinates of a point (e.g., position of finger, mouse or ball) are its distances from two intersecting, often perpendicular straight lines, the distance from each being measured along a straight line parallel to each other. For example, the x, y positions of the mouse, ball and finger may be monitored. The x, y positions are then used to correspondingly locate and move the input pointer on the display screen.

To elaborate further, touch pads generally include one or more sensors for detecting the proximity of the finger thereto. By way of example, the sensors may be based on resistive sensing, surface acoustic wave sensing, pressure sensing, optical sensing, capacitive sensing and the like. The sensors are generally dispersed about the touch pad with each sensor representing an x, y position. In most cases, the sensors are arranged in a grid of columns and rows. Distinct x and y position signals, which control the x, y movement of a pointer device on the display screen, are thus generated when a finger is moved across the grid of sensors within the touch pad. For brevity sake, the remaining discussion will be held to the discussion of capacitive sensing technologies. It should be noted, however, that the other technologies have similar features.

Capacitive sensing touch pads generally contain several layers of material. For example, the touch pad may include a protective shield, one or more electrode layers and a circuit board. The protective shield typically covers the electrode layer(s), and the electrode layer(s) is generally disposed on a front side of the circuit board. As is generally well known, the protective shield is the part of the touch pad that is touched by the user to implement cursor movements on a display screen. The electrode layer(s), on the other hand, is used to interpret the x, y position of the user's finger when the user's finger is resting or moving on the protective shield. The electrode layer (s) typically consists of a plurality of electrodes that are positioned in columns and rows so as to form a grid array. The columns and rows are generally based on the Cartesian coordinate system and thus the rows and columns correspond to the x and y directions.

The touch pad may also include sensing electronics for detecting signals associated with the electrodes. For example, the sensing electronics may be adapted to detect the change in capacitance at each of the electrodes as the finger passes over the grid. The sensing electronics are generally located on the backside of the circuit board. By way of example, the sensing electronics may include an application specific integrated circuit (ASIC) that is configured to measure the amount of capacitance in each of the electrodes and to compute the position of finger movement based on the capacitance in each of the electrodes. The ASIC may also be configured to report this information to the computing device.

Referring to FIG. 1, a touch pad 10 will be described in greater detail. The touch pad is generally a small rectangular area that includes a protective shield 12 and a plurality of electrodes 14 disposed underneath the protective shield layer 12. For ease of discussion, a portion of the protective shield layer 12 has been removed to show the electrodes 14. Each of the electrodes 14 represents a different x, y position. In one configuration, as a finger 16 approaches the electrode grid 14, a tiny capacitance forms between the finger 16 and the electrodes 14 proximate the finger 16. The circuit board/sensing electronics measures capacitance and produces an x, y input signal 18 corresponding to the active electrodes 14 is sent to a host device 20 having a display screen 22. The x, y input signal 18 is used to control the movement of a cursor 24 on a display screen 22. As shown, the input pointer moves in a similar x, y direction as the detected x, y finger motion.

SUMMARY OF THE INVENTION

The present invention relates generally to touch pads capable of detecting an object in close proximity thereto. More particularly, the present invention relates to touch pads capable of moving in order to increase the functionality of the touch pad. For example, the touch pad may be depressible so as to provide additional button functionality.

The invention relates in one embodiment to an input device. The input device includes a movable touch pad configured to generate a first control signal when the movable touchpad is moved and a second control signal when an object is positioned over the movable touchpad.

The invention relates in another embodiment to an input device. The input device includes a frame. The input device also includes a rigid touch pad movably restrained to the frame. The rigid touch pad is configured to generate tracking signals when an object is positioned over the rigid touchpad. The input device further includes one or more movement indictors contained within the frame. The movement indicators are configured to generate one or more button signals when the rigid touch pad is moved relative to the frame.

The invention relates in another embodiment to an input device. The input device includes a touch pad assembly and a housing assembly The touch pad assembly includes a circuit board having a first side and a second side, an electrode layer positioned on the first side of the circuit board, a cosmetic plate positioned over the electrode layer, one or more switches positioned on the second side of the circuit board, and a stiffener plate positioned on the second side of the circuit board. The housing assembly includes a base plate, a frame and one or more retaining plates that cooperate to movably constrain at least a portion of the touch assembly within a space defined by the base plate, frame and one or more retaining plates.

The invention relates in another embodiment to a computing system. The computer system includes a computing device capable of receiving, processing and outputting data. The computer system also includes an input device configured to send data to the computing device in order to perform an action in the computing device. The input device includes a depressible touch pad configured to generate tracking signals, and one or more movement indicators configured to generate one or more button signals when the touch pad is depressed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 17 is an exploded perspective diagram of a media player and input device assembly, in accordance with one embodiment of the present invention.

FIG. 18 is a side elevation view of the bottom side of a media player containing an input device, in accordance with one embodiment of the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known parts and methods have not been described in detail in order not to unnecessarily obscure the present invention.

Figure 1:
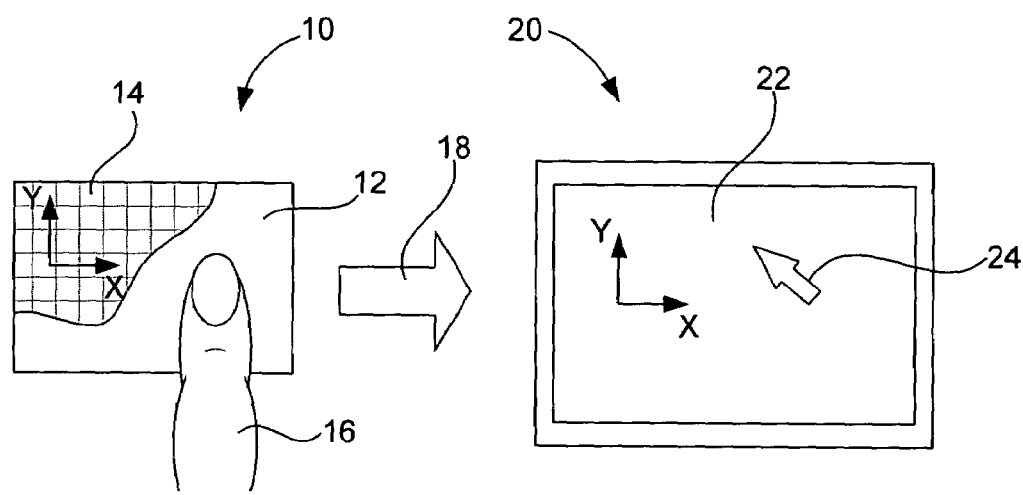
FIG. 1 is a simplified diagram of a touch pad and display.
Figure 2:
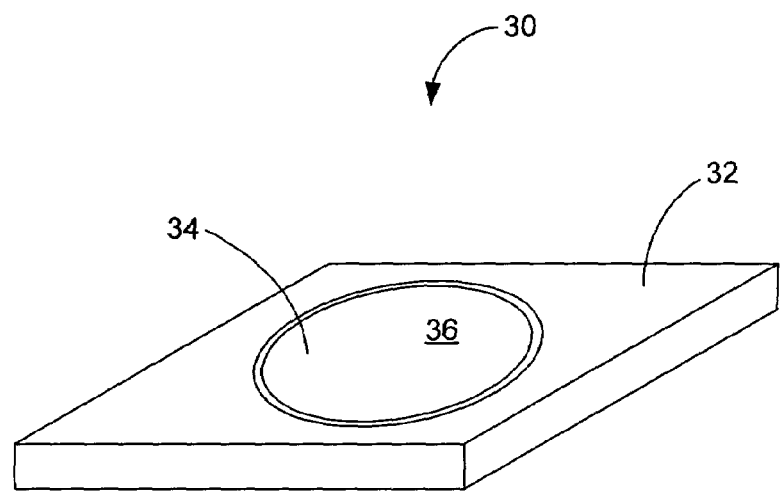
FIG. 2 is a perspective view of an input device, in accordance with one embodiment of the present invention.

FIG. 2 is a simplified perspective view of an input device 30, in accordance with one embodiment of the present invention. The input device 30 is generally configured to send information or data to an electronic device in order to perform an action on a display screen (e.g., via a graphical user interface). For example, moving an input pointer, making a selection, providing instructions, etc. The input device may interact with the electronic device through a wired (e.g., cable/ connector) or wireless connection (e.g., IR, bluetooth, etc.). The input device 30 may be a stand alone unit or it may be integrated into the electronic device. When a stand alone unit, the input device typically has its own enclosure. When integrated with an electronic device, the input device typically uses the enclosure of the electronic device. In either case, the input device may be structurally coupled to the enclosure as for example through screws, snaps, retainers, adhesives and the like. In some cases, the input device may be removably coupled to the electronic device as for example through a docking station. The electronic device to which the input device is coupled may correspond to any consumer related electronic product. By way of example, the electronic device may correspond to a computer such as desktop computer, laptop computer or PDA, a media player such as a music player, a communication device such as a cellular phone, another input device such as a keyboard, and the like.

As shown in FIG. 2, the input device 30 includes a frame 32 (or support structure) and a touch pad 34. The frame 32 provides a structure for supporting the components of the input device. The frame 32 in the form of a housing may also enclose or contain the components of the input device. The components, which include the touch pad 34, may correspond to electrical, optical and/or mechanical components for operating the input device 30.

The touch pad 34 provides an intuitive interface configured to provide one or more control functions for controlling various applications associated with the electronic device to which it is attached. By way of example, the touch initiated control function may be used to move an object or perform an action on the display screen or to make selections or issue commands associated with operating the electronic device. In order to implement the touch initiated control function, the touch pad 34 may be arranged to receive input from a finger (or object) moving across the surface of the touch pad 34 (e.g., linearly, radially, rotary, etc.), from a finger holding a particular position on the touch pad 34 and/or by a finger tapping on a particular position of the touch pad 34. As should be appreciated, the touch pad 34 provides easy one-handed operation, i.e., lets a user interact with the electronic device with one or more fingers.

The touch pad 34 may be widely varied. For example, the touch pad 34 may be a conventional touch pad based on the Cartesian coordinate system, or the touch pad 34 may be a touch pad based on a Polar coordinate system. An example of a touch pad based on polar coordinates may be found in patent application Ser. No. 10/188,182, entitled "TOUCH PAD FOR HANDHELD DEVICE", filed Jul. 1, 2002, which is herein incorporated by reference. Furthermore, the touch pad 34 may be used in a relative and/or absolute mode. In absolute mode, the touch pad 34 reports the absolute coordinates of where it is being touched. For example x, y in the case of the Cartesian coordinate system or (r, θ) in the case of the Polar coordinate system. In relative mode, the touch pad 34 reports the direction and/or distance of change. For example, left/right, up/down, and the like. In most cases, the signals produced by the touch pad 34 direct motion on the display screen in a direction similar to the direction of the finger as it is moved across the surface of the touch pad 34.

The shape of the touch pad 34 may be widely varied. For example, the touch pad 34 may be circular, oval, square, rectangular, triangular, and the like. In general, the outer perimeter of the touch pad 34 defines the working boundary of the touch pad 34. In the illustrated embodiment, the touch pad is circular. Circular touch pads allow a user to continuously swirl a finger in a free manner, i.e., the finger can be rotated through 360 degrees of rotation without stopping. Furthermore, the user can rotate his or her finger tangentially from all sides thus giving it more range of finger positions. Both of these features may help when performing a scrolling function. Furthermore, the size of the touch pad 34 generally corresponds to a size that allows them to be easily manipulated by a user (e.g., the size of a finger tip or larger).

The touch pad 34, which generally takes the form of a rigid planar platform, includes a touchable outer surface 36 for receiving a finger (or object) for manipulation of the touch pad. Although not shown in FIG. 2, beneath the touchable outer surface 36 is a sensor arrangement that is sensitive to such things as the pressure and motion of a finger thereon. The sensor arrangement typically includes a plurality of sensors that are configured to activate as the finger sits on, taps on or passes over them. In the simplest case, an electrical signal is produced each time the finger is positioned over a sensor. The number of signals in a given time frame may indicate location, direction, speed and acceleration of the finger on the touch pad 34, i.e., the more signals, the more the user moved his or her finger. In most cases, the signals are monitored by an electronic interface that converts the number, combination and frequency of the signals into location, direction, speed and acceleration information. This information may then be used by the electronic device to perform the desired control function on the display screen. The sensor arrangement may be widely varied. By way of example, the sensors may be based on resistive sensing, surface acoustic wave sensing, pressure sensing (e.g., strain gauge), optical sensing, capacitive sensing and the like.

In the illustrated embodiment, the touch pad 34 is based on capacitive sensing. As is generally well known, a capacitively based touch pad is arranged to detect changes in capacitance as the user moves an object such as a finger around the touch pad. In most cases, the capacitive touch pad includes a protective shield, one or more electrode layers, a circuit board and associated electronics including an application specific integrated circuit (ASIC). The protective shield is placed over the electrodes; the electrodes are mounted on the top surface of the circuit board; and the ASIC is mounted on the bottom surface of the circuit board. The protective shield serves to protect the underlayers and to provide a surface for allowing a finger to slide thereon. The surface is generally smooth so that the finger does not stick to it when moved. The protective shield also provides an insulating layer between the finger and the electrode layers. The electrode layer includes a plurality of spatially distinct electrodes. Any suitable number of electrodes may be used. In most cases, it would be desirable to increase the number of electrodes so as to provide higher resolution, i.e., more information can be used for things such as acceleration.

Capacitive sensing works according to the principals of capacitance. As should be appreciated, whenever two electrically conductive members come close to one another without actually touching, their electric fields interact to form capacitance. In the configuration discussed above, the first electrically conductive member is one or more of the electrodes and the second electrically conductive member is the finger of the user. Accordingly, as the finger approaches the touch pad, a tiny capacitance forms between the finger and the electrodes in close proximity to the finger. The capacitance in each of the electrodes is measured by ASIC located on the backside of the circuit board. By detecting changes in capacitance at each of the electrodes, the ASIC can determine the location, direction, speed and acceleration of the finger as it is moved across the touch pad. The ASIC can also report this information in a form that can be used by the electronic device.

In accordance with one embodiment, the touch pad 34 is movable relative to the frame 32 so as to initiate another set of signals (other than just tracking signals). By way of example, the touch pad 34 in the form of the rigid planar platform may rotate, pivot, slide, translate, flex and/or the like relative to the frame 32. The touch pad 34 may be coupled to the frame 32 and/or it may be movably restrained by the frame 32. By way of example, the touch pad 34 may be coupled to the frame 32 through axels, pin joints, slider joints, ball and socket joints, flexure joints, magnets, cushions and/or the like. The touch pad 34 may also float within a space of the frame (e.g., gimbal). It should be noted that the input device 30 may additionally include a combination of joints such as a pivot/translating joint, pivot/flexure joint, pivot/ball and socket joint, translating/flexure joint, and the like to increase the range of motion (e.g., increase the degree of freedom). When moved, the touch pad 34 is configured to actuate a circuit that generates one or more signals. The circuit generally includes one or more movement indicators such as switches, sensors, encoders, and the like. An example of a rotating platform which can be modified to include a touch pad may be found in patent application Ser. No. 10/072,765, entitled, "MOUSE HAVING A ROTARY DIAL," filed Feb. 7, 2002, which is herein incorporated by reference.

Figure 3A:
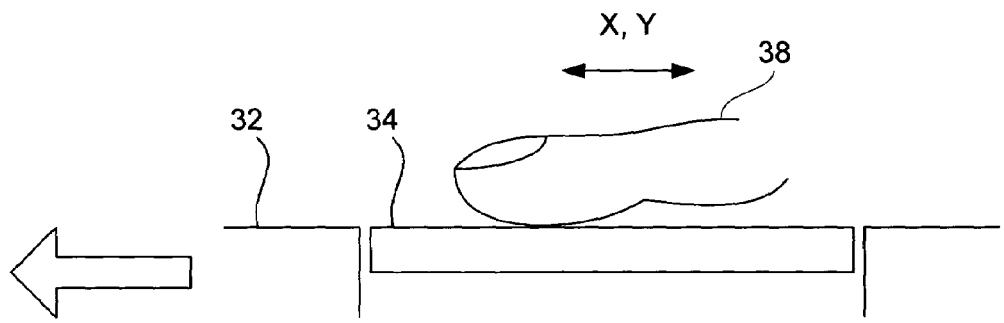
FIGS. 3A and 3B are simplified side views of an input device having a button touch pad, in accordance with one embodiment of the present invention.
Figure 3B:
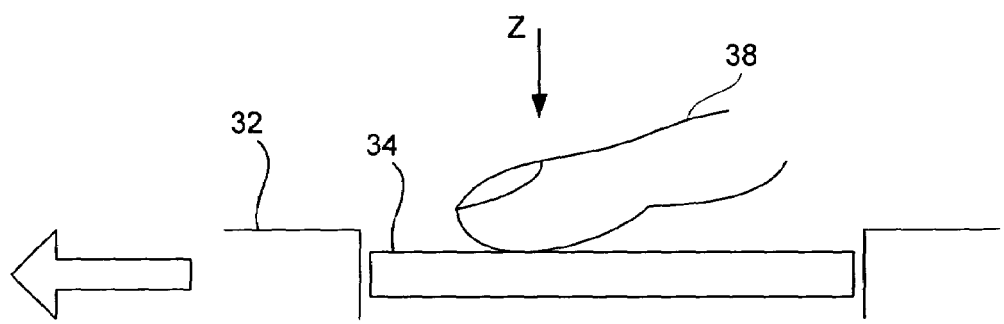

In the illustrated embodiment, the touch pad 34 takes the form of a depressible button that performs one or more mechanical clicking actions. That is, a portion or the entire touch pad 34 acts like a single or multiple button such that one or more additional button functions may be implemented by pressing on the touch pad 34 rather tapping on the touch pad or using a separate button. As shown in FIGS. 3A and 3B, according to one embodiment of the invention, the touch pad 34 is capable of moving between an upright position (FIG. 3A) and a depressed position (FIG. 3B) when a substantial force from a finger 38, palm, hand or other object is applied to the touch pad 34. The touch pad 34 is typically spring biased in the upright position as for example through a spring member. The touch pad 34 moves to the depressed position when the spring bias is overcome by an object pressing on the touch pad 34.

As shown in FIG. 3A, in the upright position, the touch pad 34 generates tracking signals when an object such as a user's finger is moved over the top surface of the touch pad in the X,Y plane. As shown in FIG. 3B, in the depressed position (Z direction), the touch pad 34 generates one or more button signals. The button signals may be used for various functionalities including but not limited to making selections or issuing commands associated with operating an electronic device. By way of example, in the case of a music player, the button functions may be associated with opening a menu, playing a song, fast forwarding a song, seeking through a menu and the like. In some cases, the input device 30 may be arranged to provide both the tracking signals and the button signal at the same time, i.e., simultaneously depressing the touch pad 34 in the z direction while moving planarly in the x, y directions. In other cases, the input device 30 may be arranged to only provide a button signal when the touch pad 34 is depressed and a tracking signal when the touch pad 34 is upright. The later case generally corresponds to the embodiment shown in FIGS. 3A and 3B.

To elaborate, the touch pad 34 is configured to actuate one or more movement indicators, which are capable of generating the button signal, when the touch pad 34 is moved to the depressed position. The movement indicators are typically located within the frame 32 and may be coupled to the touch pad 34 and/or the frame 32. The movement indicators may be any combination of switches and sensors. Switches are generally configured to provide pulsed or binary data such as activate (on) or deactivate (off). By way of example, an underside portion of the touch pad 34 may be configured to contact or engage (and thus activate) a switch when the user presses on the touch pad 34. The sensors, on the other hand, are generally configured to provide continuous or analog data. By way of example, the sensor may be configured to measure the position or the amount of tilt of the touch pad 34 relative to the frame when a user presses on the touch pad 34. Any suitable mechanical, electrical and/or optical switch or sensor may be used. For example, tact switches, force sensitive resistors, pressure sensors, proximity sensors, and the like may be used. In some case, the spring bias for placing the touch pad 34 in the upright position is provided by a movement indicator that includes a spring action.

Figure 4:
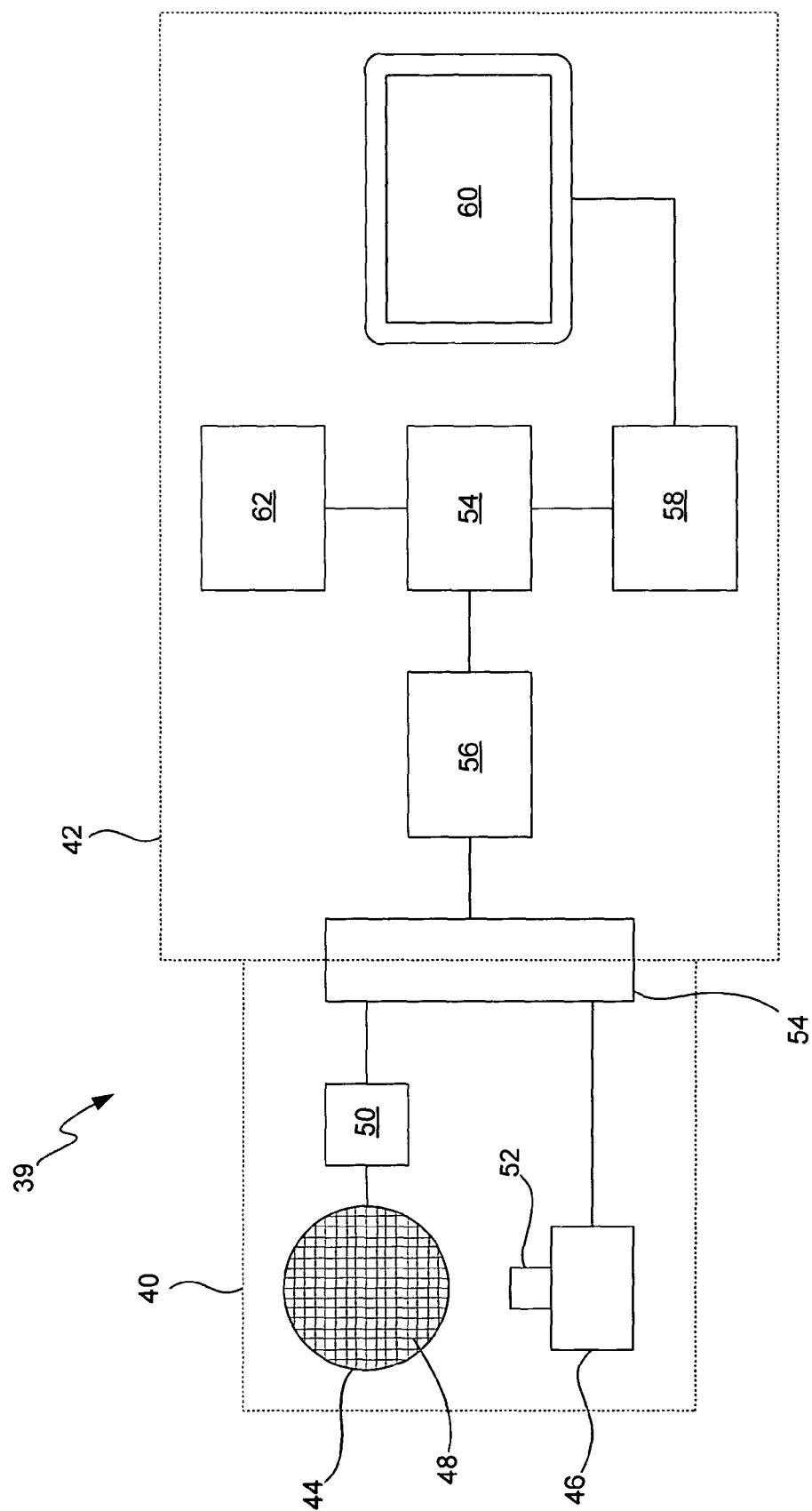
FIG. 4 is simplified block diagram of an input device connected to a computing device, in accordance with one embodiment of the present invention.

FIG. 4 is a simplified block diagram of a computing system, in accordance with one embodiment of the present invention. The computing system generally includes an input device 40 operatively connected to a computing device 42. By way of example, the input device 40 may generally correspond to the input device 30 shown in FIGS. 2, 3A and 3B, and the computing device 42 may correspond to a computer, PDA, media player or the like. As shown, the input device 40 includes a depressible touch pad 44 and one or more movement indicators 46. The touch pad 44 is configured to generate tracking signals and the movement indicator 46 is configured to generate a button signal when the touch pad is depressed. Although the touch pad 44 may be widely varied, in this embodiment, the touch pad 44 includes capacitance sensors 48 and a control system 50 for acquiring the position signals from the sensors 48 and supplying the signals to the computing device 42. The control system 50 may include an application specific integrated circuit (ASIC) that is configured to monitor the signals from the sensors 48, to compute the angular location, direction, speed and acceleration of the monitored signals and to report this information to a processor of the computing device 42. The movement indicator 46 may also be widely varied. In this embodiment, however, the movement indicator 46 takes the form of a switch that generates a button signal when the touch pad 44 is depressed. The switch 46 may correspond to a mechanical, electrical or optical style switch. In one particular implementation, the switch 46 is a mechanical style switch that includes a protruding actuator 52 that may be pushed by the touch pad 44 to generate the button signal. By way of example, the switch may be a tact switch.

Both the touch pad 44 and the switch 46 are operatively coupled to the computing device 42 through a communication interface 54. The communication interface provides a connection point for direct or indirect connection between the input device and the electronic device. The communication interface 54 may be wired (wires, cables, connectors) or wireless (e.g., transmitter/receiver).

Referring to the computing device 42, the computing device 42 generally includes a processor 54 (e.g., CPU or microprocessor) configured to execute instructions and to carry out operations associated with the computing device 42. For example, using instructions retrieved for example from memory, the processor may control the reception and manipulation of input and output data between components of the computing device 42. In most cases, the processor 54 executes instruction under the control of an operating system or other software. The processor 54 can be a single-chip processor or can be implemented with multiple components.

The computing device 42 also includes an input/output (I/O) controller 56 that is operatively coupled to the processor 54. The (I/O) controller 56 may be integrated with the processor 54 or it may be a separate component as shown. The I/O controller 56 is generally configured to control interactions with one or more I/O devices that can be coupled to the computing device 42 as for example the input device 40. The I/O controller 56 generally operates by exchanging data between the computing device 42 and I/O devices that desire to communicate with the computing device 42.

The computing device 42 also includes a display controller 58 that is operatively coupled to the processor 54. The display controller 58 may be integrated with the processor 54 or it may be a separate component as shown. The display controller 58 is configured to process display commands to produce text and graphics on a display screen 60. By way of example, the display screen 60 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the illustrated embodiment, the display device corresponds to a liquid crystal display (LCD).

In most cases, the processor 54 together with an operating system operates to execute computer code and produce and use data. The computer code and data may reside within a program storage area 62 that is operatively coupled to the processor 54. Program storage area 62 generally provides a place to hold data that is being used by the computing device 42. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 62 is configured to store information for controlling how the tracking and button signals generated by the input device are used by the computing device 42.

Figure 5:
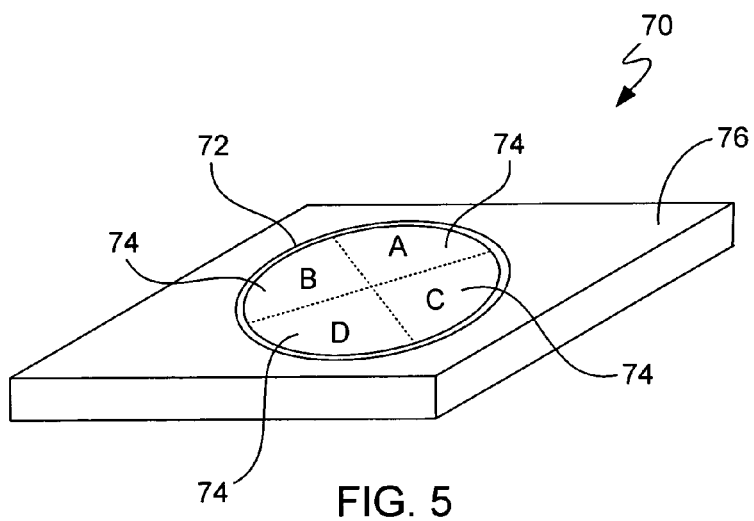
FIG. 5 is a simplified perspective diagram of an input device, in accordance with one embodiment of the present invention.

FIG. 5 is a simplified perspective diagram of an input device 70, in accordance with one embodiment of the present invention. Like the input device shown in the embodiment of FIG. 3, this input device 70 incorporates the functionality of a button (or buttons) directly into a touch pad 72, i.e., the touch pad acts like a button. In this embodiment, however, the touch pad 72 is divided into a plurality of independent and spatially distinct button zones 74. The button zones 74 represent regions of the touch pad 72 that may be moved by a user to implement distinct button functions. The dotted lines represent areas of the touch pad 72 that make up an individual button zone. Any number of button zones may be used. For example, two or more, four, eight, etc. In the illustrated embodiment, the touch pad 72 includes four button zones 74A-74D.

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like. In the case of a music player, one of the button zones may be used to access a menu on the display screen, a second button zone may be used to seek forward through a list of songs or fast forward through a currently played song, a third button zone may be used to seek backwards through a list of songs or fast rearward through a currently played song, and a fourth button zone may be used to pause or stop a song that is being played.

To elaborate, the touch pad 72 is capable of moving relative to a frame 76 so as to create a clicking action for each of the button zones 74A-D. The frame 76 may be formed from a single component or it may be a combination of assembled components. The clicking actions are generally arranged to actuate one or more movement indicators contained inside the frame 76. That is, a particular button zone moving from a first position (e.g., upright) to a second position (e.g., depressed) is caused to actuate a movement indicator. The movement indicators are configured to sense movements of the button zones during the clicking action and to send signals corresponding to the movements to the electronic device. By way of example, the movement indicators may be switches, sensors and/or the like.

The arrangement of movement indicators may be widely varied. In one embodiment, the input device may include a movement indicator for each button zone 74. That is, there may be a movement indicator corresponding to every button zone 74. For example, if there are two button zones, then there will be two movement indicators. In another embodiment, the movement indicators may be arranged in a manner that simulates the existence of a movement indicator for each button zone 74. For example, two movement indicators may be used to form three button zones. In another embodiment, the movement indicators may be configured to form larger or smaller button zones. By way of example, this may be accomplished by careful positioning of the movement indicators or by using more than one movement indicator for each button zone. It should be noted that the above embodiments are not a limitation and that the arrangement of movement indicators may vary according to the specific needs of each device.

The movements of each of the button zones 74 may be provided by various rotations, pivots, translations, flexes and the like. In one embodiment, the touch pad 72 is configured to gimbal relative to the frame 76 so as to generate clicking actions for each of the button zones. By gimbal, it is generally meant that the touch pad 72 is able to float in space relative to the frame 76 while still being constrained thereto. The gimbal may allow the touch pad 72 to move in single or multiple degrees of freedom (DOF) relative to the housing. For example, movements in the x, y and/or z directions and/or rotations about the x, y, and/or z axes ($\theta_x, \theta_y, \theta_z$).

Figure 6:
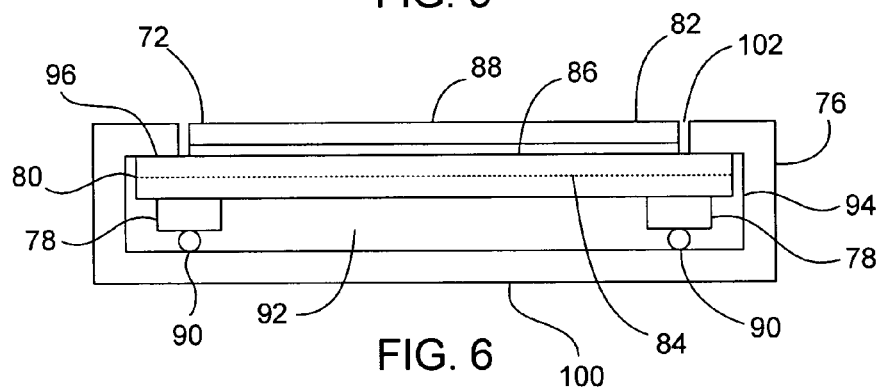
FIG. 6 is a side elevation view of a multi button zone touch pad, in accordance with one embodiment of the present invention.

Referring to FIG. 6, a particular implementation of the multiple button zone touch pad 72 of FIG. 5 will be described. In this embodiment, the input device 70 includes a movement indicator 78 for each of the button zones 74A-D shown in FIG. 5. That is, there is a movement indicator 78 disposed beneath each of the button zones 74A-D. Furthermore, the touch pad 72 is configured to gimbal relative to the frame 76 in order to provide clicking actions for each of the button zones 74A-D. The gimbal is generally achieved by movably constraining the touch pad 72 within the frame 76.

As shown in FIG. 6, the touch pad 72 includes various layers including a rigid platform 80 and a touch sensitive surface 82 for tracking finger movements. In one embodiment, the touch pad 72 is based on capacitive sensing and thus the rigid platform 80 includes a circuit board 84, and the touch sensitive surface 82 includes an electrode layer 86 and a protective layer 88. The electrode layer 86 is disposed on the top surface of the circuit board 84, and the protective layer 88 is disposed over the electrode layer 86. Although not shown in FIG. 6, the rigid platform 80 may also include a stiffening plate to stiffen the circuit board 84.

The movement indicators 78 may be widely varied, however, in this embodiment they take the form of mechanical switches. The mechanical switches 78 are typically disposed between the platform 80 and the frame 76. The mechanical switches 78 may be attached to the frame 76 or to the platform 80. In the illustrated embodiment, the mechanical switches 78 are attached to the backside of the circuit board 84 of the platform 80 thus forming an integrated unit. They are generally attached in location that places them beneath the appropriate button zone 74A-D. As shown, the mechanical switches 78 include actuators 90 that are spring biased so that they extend away from the circuit board 84. As such, the mechanical switches 78 act as legs for supporting the touch pad 72 in its upright position within the frame 76 (i.e., the actuators 90 rest on the frame 76). By way of example, the mechanical switches may correspond to tact switches and more particularly, enclosed SMT dome switches (dome switch packaged for SMT).

Moving along, the integrated unit of the touch pad 72 and switches 78 is restrained within a space 92 provided in the frame 76. The integrated unit 72/78 is capable of moving within the space 92 while still being prevented from moving entirely out of the space 92 via the walls of the frame 76. The shape of the space 92 generally coincides with the shape of the integrated unit 72/78. As such, the unit is substantially restrained along the X and Y axes via a side wall 94 of the frame 76 and along the Z axis and rotationally about the X and Y axis via a top wall 96 and a bottom wall 100 of the frame 76. A small gap may be provided between the side walls and the platform to allow the touch pad to move to its four positions without obstruction (e.g., a slight amount of play). In some cases, the platform 80 may include tabs that extend along the X and Y axis so as to prevent rotation about the Z axis. Furthermore, the top wall 96 includes an opening 102 for providing access to the touch sensitive surface 82 of the touch pad 72. The spring force provided by the mechanical switches 78 places the touch pad 72 into mating engagement with the top wall 96 of the frame 76 (e.g., upright position) and the gimbal substantially eliminates gaps and cracks found therebetween.

Figures 7A, 7B:
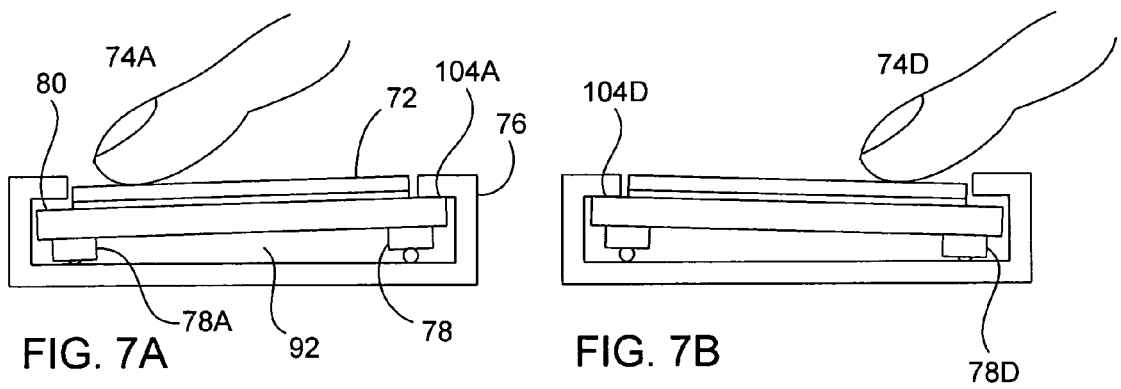
FIGS. 7A-7D show the touch pad of FIG. 6 in use, in accordance with one embodiment of the present invention.
Figures 7C, 7D:
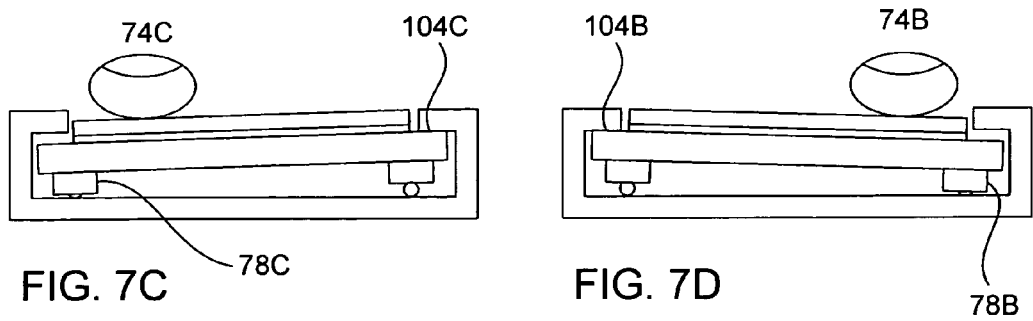

Referring to FIGS. 7A-7D, according to one embodiment, a user simply presses on the top surface of the touch pad 72 in the location of the desired button zone 74A-D in order to activate the switch 78 disposed underneath the desired button zone 74A-D. When activated, the switches 78 generate button signals that may be used by an electronic device. In all of these Figures, the force provided by the finger works against the spring force of the switch 78 until the switch 78 is activated. Although the platform 80 essentially floats within the space of the frame 76, when the user presses on one side of the touch pad 72, the opposite side contacts the top wall 96 thus causing the touch pad 72 to pivot about the contact point without actuating the opposite switch 78. In essence, the touch pad 72 pivots about four different axis, although two of the axis are substantially parallel to one another. As shown in FIG. 7A, the touch pad 72 pivots about the contact point 104A when a user selects button zone 74A thereby causing the mechanical switch 78A to be activated. As shown in FIG. 7B, the touch pad 72 pivots about the contact point 104D when a user selects button zone 74D thereby causing the mechanical switch 78D to be activated. As shown in FIG. 7C, the touch pad 72 pivots about the contact point 104C when a user selects button zone 74C thereby causing the mechanical switch 78C to be activated. As shown in FIG. 7D, the touch pad 72 pivots about the contact point 104B when a user selects button zone 74B thereby causing the mechanical switch 78B to be activated.

Figure 8:
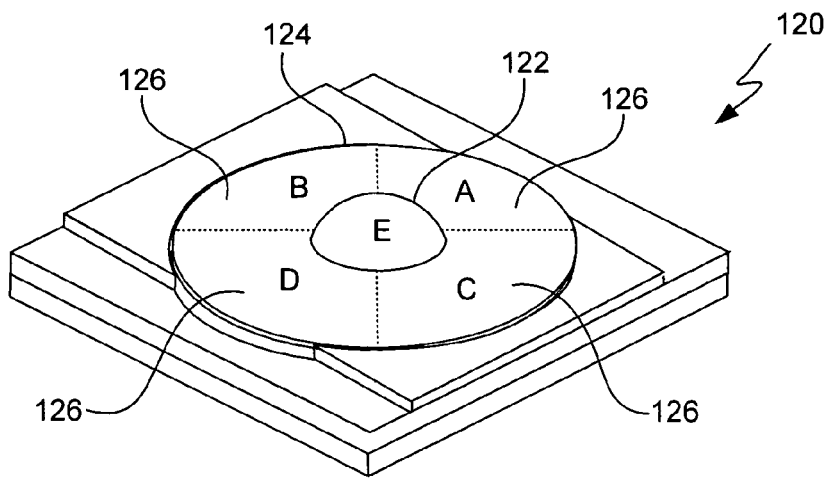
FIG. 8 is a perspective diagram of an input device, in accordance with one embodiment of the present invention.
Figure 10:
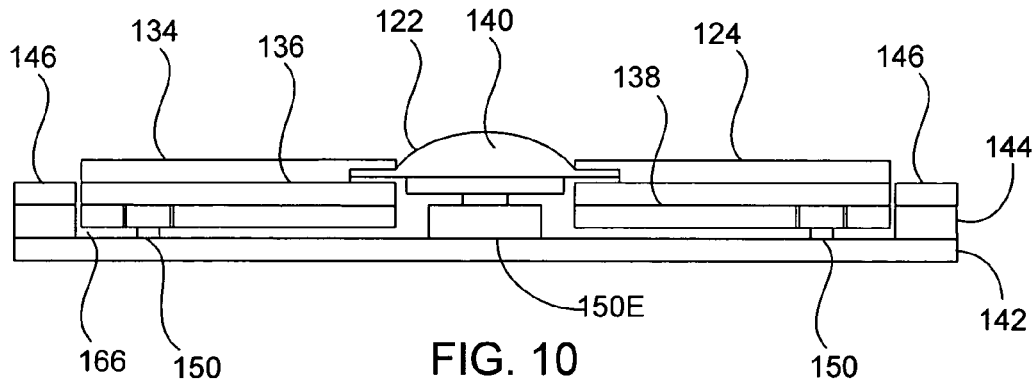
FIG. 10 is a side elevation, in cross section, of an input device, in accordance with one embodiment of the present invention.
Figure 11:
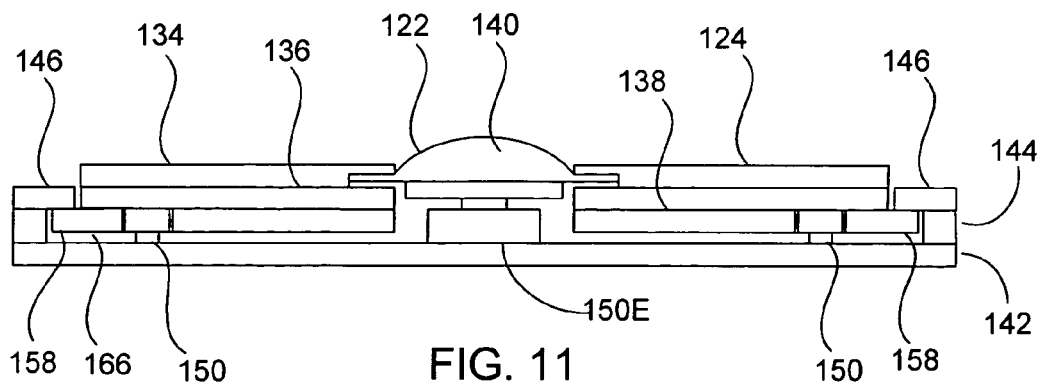
FIG. 11 is a side elevation, in cross section, of an input device, in accordance with one embodiment of the present invention.
Figure 9:
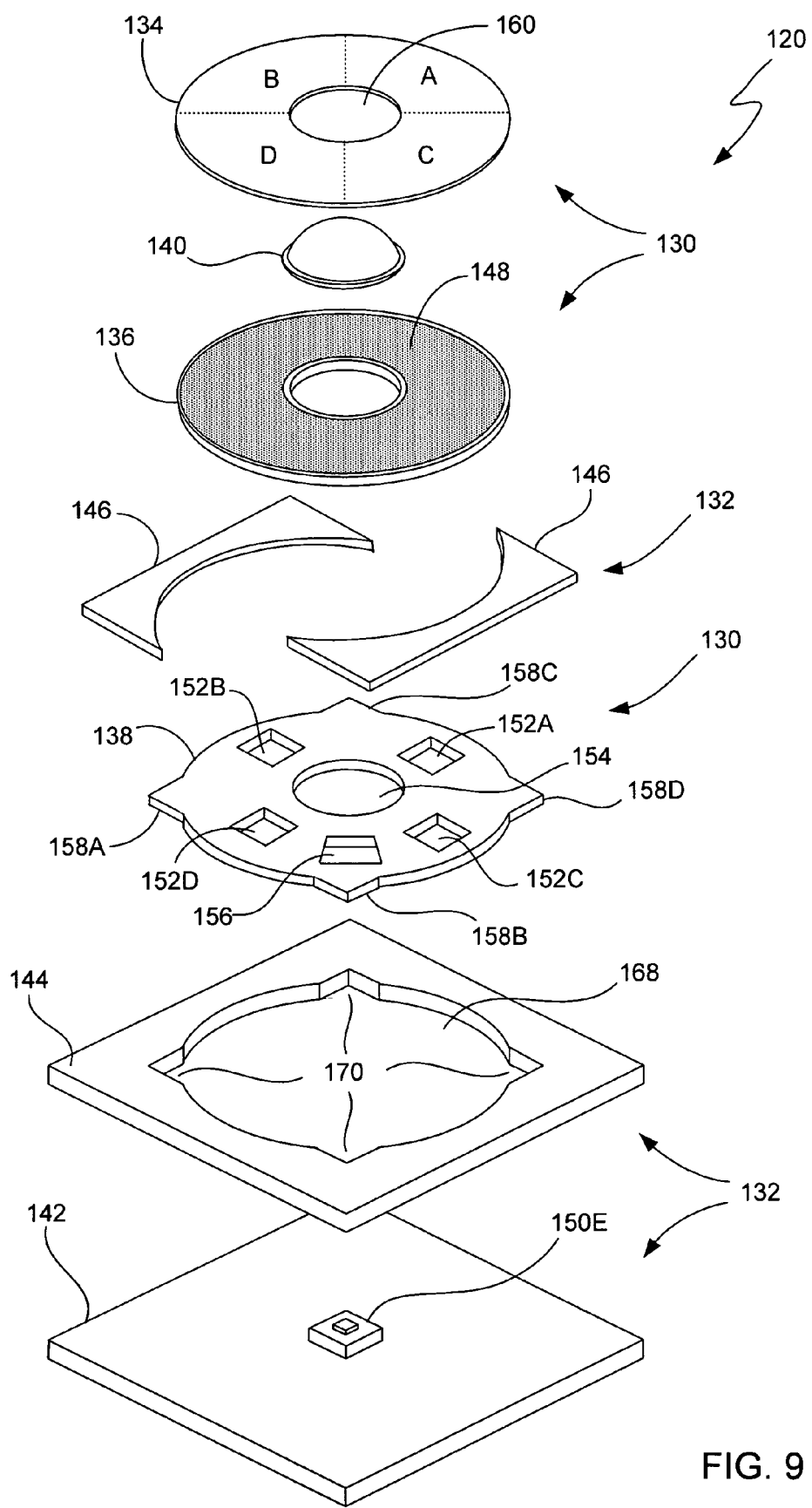
FIG. 9 is an exploded perspective diagram of an input device, in accordance with one embodiment of the present invention.

FIGS. 8-11 are diagrams of an input device 120, in accordance with one embodiment of the present invention. FIG. 8 is a perspective view of an assembled input device 120 and FIG. 9 is an exploded perspective view of a disassembled input device 120. FIGS. 10 and 11 are side elevation views, in cross section, of the input device 120 in its assembled condition (taken along lines 10-10' and 11-11' respectively). By way of example, the input device 120 may generally correspond to the input device described in FIGS. 5-7. Unlike the input device of FIGS. 5-7, however, the input device 120 shown in these Figures includes a separate mechanical button 122 disposed at the center of the touch pad 124 having four button zones 126A-D. The separate mechanical button 122 further increases the button functionality of the input device 120 (e.g., from four to five).

Figure 12:
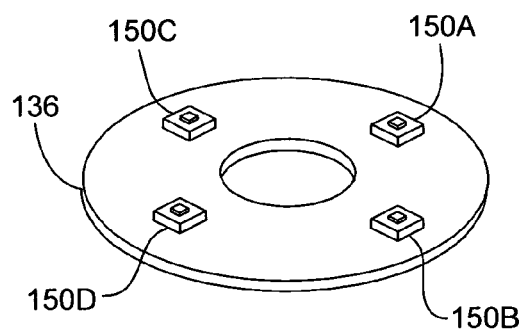
FIG. 12 is a perspective diagram of a touch pad having switches on its backside, in accordance with one embodiment of the present invention.

Referring to FIGS. 9-11, the input device 120 includes a circular touch pad assembly 130 and a housing 132. The circular touch pad assembly 130 is formed by a cosmetic disc 134, circuit board 136, stiffener plate 138 and button cap 140. The circuit board 136 includes an electrode layer 148 on the top side and four mechanical switches 150 on the backside (see FIG. 12). The switches 150 may be widely varied. Generally, they may correspond to tact switches. More particularly, they correspond to packaged or encased SMT mounted dome switches. By way of example, dome switches manufactured by APLS of Japan may be used. Although not shown, the backside of the circuit board 136 also includes support circuitry for the touch pad (e.g., ASIC, connector, etc.). The cosmetic disc 134, which is attached to the top side of the circuit board 136 is configured to protect the electrode layer 148 located thereon. The cosmetic disc 134 may be formed from any suitable material although it is typically formed from a non conducting material when capacitance sensing is used. By way of example, the cosmetic disc may be formed from plastic, glass, wood and the like. Furthermore, the cosmetic disc 134 may be attached to the circuit board 136 using any suitable attachment means, including but not limited to adhesives, glue, snaps, screws and the like. In one embodiment, double sided tape is positioned between the circuit board 136 and the cosmetic disc 134 in order to attach the cosmetic disc 134 to the circuit board 136.

The stiffener plate 138, which is attached to the back side of the circuit board 136, is configured to add stiffness to the circuit board 136. As should be appreciated, circuit boards typically have a certain amount of flex. The stiffener plate 138 reduces the amount of flex so as to form a rigid structure. The stiffener plate 138 includes a plurality of holes. Some of the holes 152 are configured to receive the four mechanical switches 150 therethrough while other holes such as holes 154 and 156 may be used for component clearance (or other switches). The stiffener plate 138 also includes a plurality of ears 158 extending from the outer peripheral edge of the stiffener plate 138. The ears 158 are configured to establish the axes around which the touch pad assembly 130 pivots in order to form a clicking action for each of the button zones 126A-D as well as to retain the touch pad assembly 130 within the housing 132. The stiffener plate may be formed from any rigid material. For example, the stiffener plate may be formed from steel, plastic and the like. In some cases, the steel may be coated. Furthermore, the stiffener plate 138 may be attached to the circuit board 136 using any suitable attachment means, including but not limited to adhesives, glue, snaps, screws and the like. In one embodiment, double sided tape is positioned between the circuit board 136 and the stiffener plate 138 in order to attach the stiffener plate 138 to the circuit board 136.

Furthermore, the button cap 140 is disposed between the cosmetic disc 134 and the top side of the circuit board 136. A portion of the button cap 140 is configured to protrude through an opening 160 in the cosmetic disc 134 while another portion is retained in a space formed between the cosmetic disc 134 and the top surface of the circuit board 134 (see FIGS. 10 and 11). The protruding portion of the button cap 140 may be pushed to activate a switch 150E located underneath the button cap 140. The switch 150E is attached to the housing 132 and passes through openings in the stiffener plate 138, circuit board 136 and cosmetic disc 134. When assembled, the actuator of the switch 150E via a spring element forces the button cap 140 into an upright position as shown in FIGS. 10 and 11.

The housing 132, on the other hand, is formed by a base plate 142, a frame 144 and a pair of retainer plates 146. When assembled, the retaining plates 146, base plate 142 and frame 144 define a space 166 for movably restraining the stiffener plate 138 to the housing 132. The frame 144 includes an opening 168 for receiving the stiffener plate 138. As shown, the shape of the opening 168 matches the shape of the stiffener plate 138. In fact, the opening 168 includes alignment notches 170 for receiving the ears 158 of the stiffener plate 138. The alignment notches 170 cooperate with the ears 158 to locate the touch pad assembly 130 in the X and Y plane, prevent rotation about the Z axis, and to establish pivot areas for forming the clicking actions associated with each of the button zones 124A-D. The base plate 142 closes up the bottom of the opening 168 and the corners of the retaining plates 146 are positioned over the ears 158 and alignment notches 170 thereby retaining the stiffener plate 138 within the space 166 of the housing 132.

As shown in FIGS. 10 and 11, the frame 144 is attached to the base plate 142 and the retaining plates 146 are attached to the frame 144. Any suitable attachment means may be used including but not limited to glues, adhesives, snaps, screws and the like. In one embodiment, the retaining plates 146 are attached to the frame 144 via double sided tape, and the frame 144 is attached to the base plate 142 via screws located at the corners of the frame/base plate. The parts of the housing 132 may be formed from a variety of structural materials such as metals, plastics and the like.

In this configuration, when a user presses down on a button zone 126, the ears 158 on the other side of the button zone 126, which are contained within the alignment notches 170, are pinned against the retaining plates 146. When pinned, the contact point between the ears 158 and the retaining plates 146 define the axis around which the touch pad assembly 130 pivots relative to the housing 132. By way of example, ears 158A and 158B establish the axis for button zone 126A, ears 158C and 158D establish the axis for button zone 126D, ears 158A and 158C establish the axis for button zone 126C, and ears 158B and 158D establish the axis for button zone 126D. To further illustrate, when a user presses on button zone 126A, the touch pad assembly 130 moves downward in the area of button zone 126A. When button zone 126A moves downward against the spring force of the switch 150A, the opposing ears 158A and 158B are pinned against the corners of retaining plates 146.

Although not shown, the touch pad assembly 130 may be back lit in some cases. For example, the circuit board can be populated with light emitting diodes (LEDs) on either side in order to designate button zones, provide additional feedback and the like.

Figure 13:
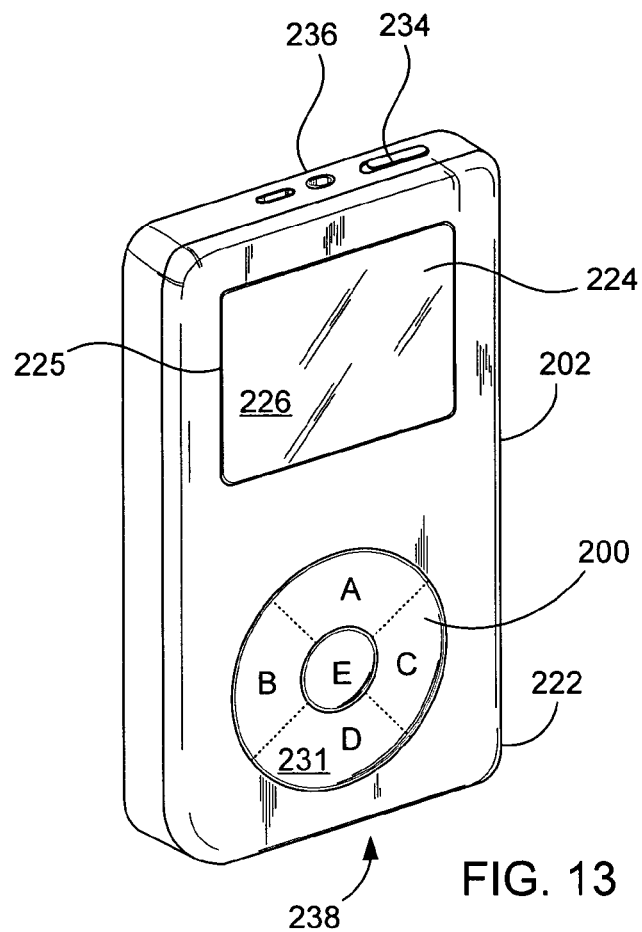
FIG. 13 is a perspective diagram of a media player, in accordance with one embodiment of the present invention.
Figure 14:
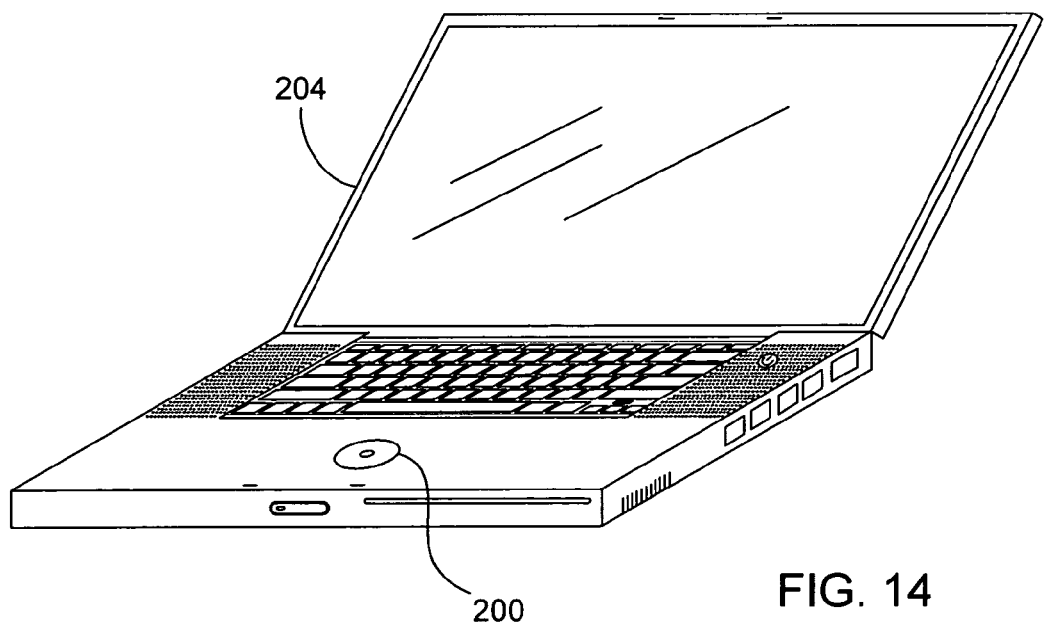
FIG. 14 is a perspective diagram of a laptop computer, in accordance with one embodiment of the present invention.
Figure 15:
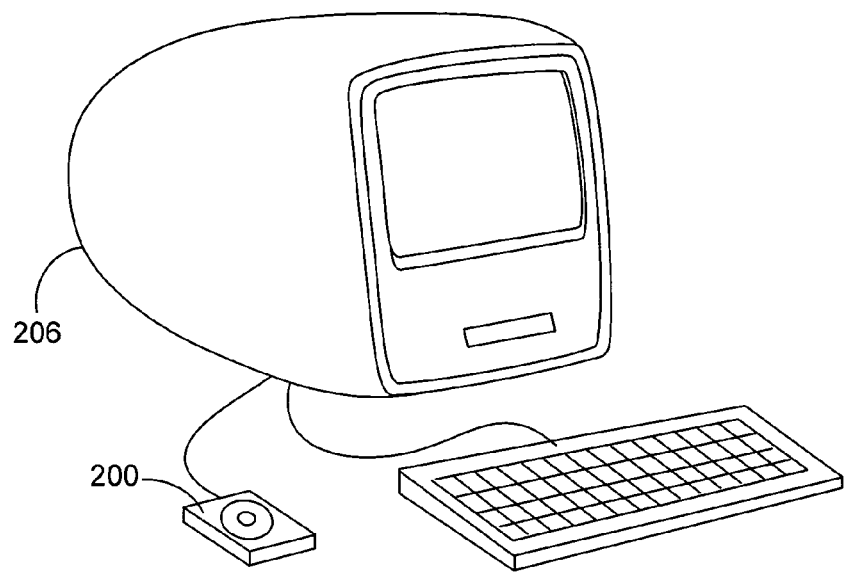
FIG. 15 is a perspective diagram of a desktop computer with a peripheral input device connected thereto, in accordance with one embodiment of the present invention.
Figure 16:
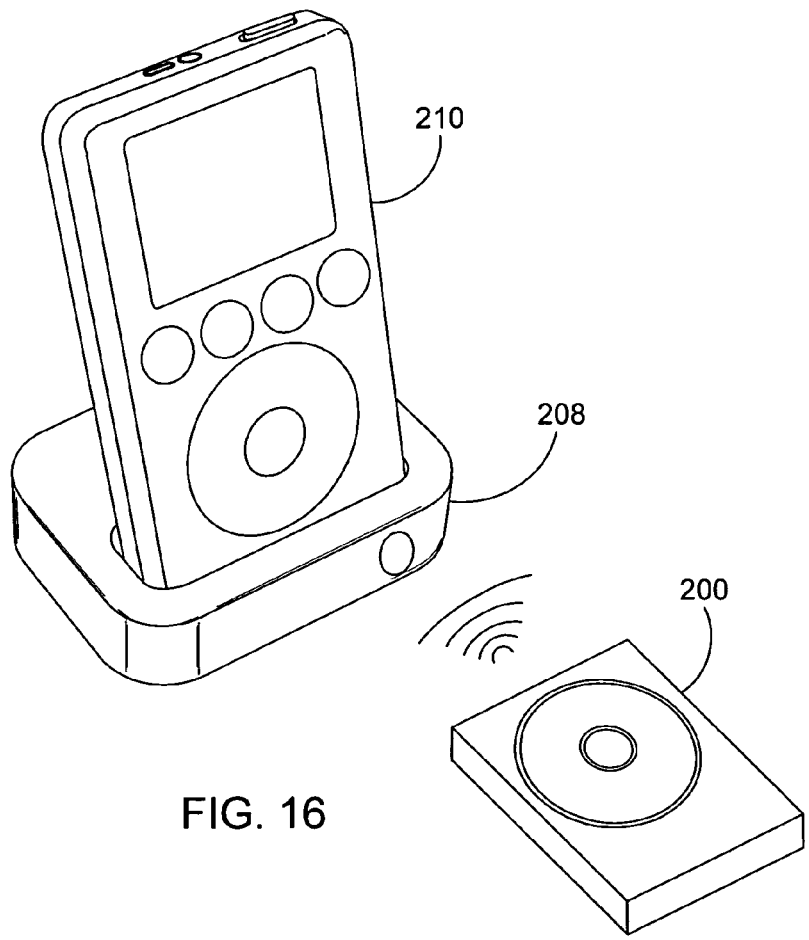
FIG. 16 is a perspective diagram of a remote control utilizing an input device, in accordance with one embodiment of the present invention.

As previously mentioned, the input devices described herein may be integrated into an electronic device or they may be separate stand alone devices. FIGS. 13 and 14 show some implementations of an input device 200 integrated into an electronic device. In FIG. 13, the input device 200 is incorporated into a media player 202. In FIG. 14, the input device 200 is incorporated into a laptop computer 204. FIGS. 15 and 16, on the other hand, show some implementations of the input device 200 as a stand alone unit. In FIG. 15, the input device 200 is a peripheral device that is connected to a desktop computer 206. In FIG. 16, the input device 200 is a remote control that wirelessly connects to a docking station 208 with a media player 210 docked therein. It should be noted, however, that the remote control can also be configured to interact with the media player (or other electronic device) directly thereby eliminating the need for a docking station. An example of a docking station for a media player can be found in patent application Ser. No. 10/423,490, "MEDIA PLAYER SYSTEM," filed Apr. 25, 2003, which is herein incorporated by reference. It should be noted that these particular embodiments are not a limitation and that many other devices and configurations may be used.

Referring back FIG. 13, the media player 202 will be discussed in greater detail. The term "media player" generally refers to computing devices that are dedicated to processing media such as audio, video or other images, as for example, music players, game players, video players, video recorders, cameras, and the like. In some cases, the media players contain single functionality (e.g., a media player dedicated to playing music) and in other cases the media players contain multiple functionality (e.g., a media player that plays music, displays video, stores pictures and the like). In either case, these devices are generally portable so as to allow a user to listen to music, play games or video, record video or take pictures wherever the user travels.

In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a laptop or notebook computer). For example, in the case of a music player, a user may use the device while working out at the gym. In case of a camera, a user may use the device while mountain climbing. In the case of a game player, the user can use the device while traveling in a car. Furthermore, the device may be operated by the users hands, no reference surface such as a desktop is needed. In the illustrated embodiment, the media player 202 is a pocket sized hand held MP3 music player that allows a user to store a large collection of music (e.g., in some cases up to 4,000 CD-quality songs). By way of example, the MP3 music player may correspond to the iPod MP3 player manufactured by Apple Computer of Cupertino, Calif. Although used primarily for storing and playing music, the MP3 music player shown herein may also include additional functionality such as storing a calendar and phone lists, storing and playing games, storing photos and the like. In fact, in some cases, it may act as a highly transportable storage device.

As shown in FIG. 13, the media player 202 includes a housing 222 that encloses internally various electrical components (including integrated circuit chips and other circuitry) to provide computing operations for the media player 202. In addition, the housing 222 may also define the shape or form of the media player 202. That is, the contour of the housing 222 may embody the outward physical appearance of the media player 202. The integrated circuit chips and other circuitry contained within the housing 222 may include a microprocessor (e.g., CPU), memory (e.g., ROM, RAM), a power supply (e.g., battery), a circuit board, a hard drive, other memory (e.g., flash) and/or various input/output (I/O) support circuitry. The electrical components may also include components for inputting or outputting music or sound such as a microphone, amplifier and a digital signal processor (DSP). The electrical components may also include components for capturing images such as image sensors (e.g., charge coupled device (CCD) or complimentary oxide semiconductor (CMOS)) or optics (e.g., lenses, splitters, filters).

In the illustrated embodiment, the media player 202 includes a hard drive thereby giving the media player massive storage capacity. For example, a 20 GB hard drive can store up to 4000 songs or about 266 hours of music. In contrast, flash-based media players on average store up to 128 MB, or about two hours, of music. The hard drive capacity may be widely varied (e.g., 5, 10, 20 MB, etc.). In addition to the hard drive, the media player 202 shown herein also includes a battery such as a rechargeable lithium polymer battery. These type of batteries are capable of offering about 10 hours of continuous playtime to the media player.

The media player 202 also includes a display screen 224 and related circuitry. The display screen 224 is used to display a graphical user interface as well as other information to the user (e.g., text, objects, graphics). By way of example, the display screen 224 may be a liquid crystal display (LCD). In one particular embodiment, the display screen corresponds to a 160-by-128-pixel high-resolution display, with a white LED backlight to give clear visibility in daylight as well as low-light conditions. As shown, the display screen 224 is visible to a user of the media player 202 through an opening 225 in the housing 222, and through a transparent wall 226 that is disposed in front of the opening 225. Although transparent, the transparent wall 226 may be considered part of the housing 222 since it helps to define the shape or form of the media player 202.

The media player 202 also includes the touch pad 200 such as any of those previously described. The touch pad 200 generally consists of a touchable outer surface 231 for receiving a finger for manipulation on the touch pad 230. Although not shown in FIG. 13, beneath the touchable outer surface 231 is a sensor arrangement. The sensor arrangement includes a plurality of sensors that are configured to activate as the finger sits on, taps on or passes over them. In the simplest case, an electrical signal is produced each time the finger is positioned over a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the media player 202 to perform the desired control function on the display screen 224. For example, a user may easily scroll through a list of songs by swirling the finger around the touch pad 200.

In addition to above, the touch pad may also include one or more movable buttons zones A-D as well as a center button E. The button zones are configured to provide one or more dedicated control functions for making selections or issuing commands associated with operating the media player 202. By way of example, in the case of an MP3 music player, the button functions may be associated with opening a menu, playing a song, fast forwarding a song, seeking through a menu, making selections and the like. In most cases, the button functions are implemented via a mechanical clicking action.

The position of the touch pad 200 relative to the housing 222 may be widely varied. For example, the touch pad 200 may be placed at any external surface (e.g., top, side, front, or back) of the housing 222 that is accessible to a user during manipulation of the media player 202. In most cases, the touch sensitive surface 231 of the touch pad 200 is completely exposed to the user. In the illustrated embodiment, the touch pad 200 is located in a lower, front area of the housing 222.

Furthermore, the touch pad 230 may be recessed below, level with, or extend above the surface of the housing 222. In the illustrated embodiment, the touch sensitive surface 231 of the touch pad 200 is substantially flush with the external surface of the housing 222.

The shape of the touch pad 200 may also be widely varied. Although shown as circular, the touch pad may also be square, rectangular, triangular, and the like. More particularly, the touch pad is annular, i.e., shaped like or forming a ring. As such, the inner and outer perimeter of the touch pad defines the working boundary of the touch pad.

The media player 202 may also include a hold switch 234. The hold switch 234 is configured to activate or deactivate the touch pad and/or buttons associated therewith. This is generally done to prevent unwanted commands by the touch pad and/or buttons, as for example, when the media player is stored inside a user's pocket. When deactivated, signals from the buttons and/or touch pad are not sent or are disregarded by the media player. When activated, signals from the buttons and/or touch pad are sent and therefore received and processed by the media player.

Moreover, the media player 202 may also include one or more headphone jacks 236 and one or more data ports 238. The headphone jack 236 is capable of receiving a headphone connector associated with headphones configured for listening to sound being outputted by the media device 202. The data port 238, on the other hand, is capable of receiving a data connector/cable assembly configured for transmitting and receiving data to and from a host device such as a general purpose computer (e.g., desktop computer, portable computer). By way of example, the data port 238 may be used to upload or down load audio, video and other images to and from the media device 202. For example, the data port may be used to download songs and play lists, audio books, ebooks, photos, and the like into the storage mechanism of the media player.

The data port 238 may be widely varied. For example, the data port may be a PS/2 port, a serial port, a parallel port, a USB port, a Firewire port and/or the like. In some cases, the data port 238 may be a radio frequency (RF) link or optical infrared (IR) link to eliminate the need for a cable. Although not shown in FIG. 12, the media player 202 may also include a power port that receives a power connector/cable assembly configured for delivering powering to the media player 202. In some cases, the data port 238 may serve as both a data and power port. In the illustrated embodiment, the data port 238 is a Firewire port having both data and power capabilities.

Although only one data port is shown, it should be noted that this is not a limitation and that multiple data ports may be incorporated into the media player. In a similar vein, the data port may include multiple data functionality, i.e., integrating the functionality of multiple data ports into a single data port. Furthermore, it should be noted that the position of the hold switch, headphone jack and data port on the housing may be widely varied. That is, they are not limited to the positions shown in FIG. 13. They may be positioned almost anywhere on the housing (e.g., front, back, sides, top, bottom). For example, the data port may be positioned on the bottom surface of the housing rather than the top surface as shown.

FIGS. 17 and 18 are diagrams showing the installation of an input device 250 into a media player 252, in accordance with one embodiment of the present invention. By way of example, the input device 250 may correspond to any of those previously described and the media player 252 may correspond to the one shown in FIG. 13. As shown, the input device 250 includes a housing 254 and a touch pad assembly 256. The media player 252 includes a shell or enclosure 258. The front wall 260 of the shell 258 includes an opening 262 for allowing access to the touch pad assembly 256 when the input device 250 is introduced into the media player 252. The inner side 264 of the front wall 260 includes a channel or track 264 for receiving the input device 250 inside the shell 258 of the media player 252. The channel 264 is configured to receive the edges of the housing 254 of the input device 250 so that the input device 250 can be slid into its desired place within the shell 258. The shape of the channel has a shape that generally coincides with the shape of the housing 254. During assembly, the circuit board 266 of the touch pad assembly 256 is aligned with the opening 262 and a cosmetic disc 268 and button cap 270 are mounted onto the top side of the circuit board 266. As shown, the cosmetic disc 268 has a shape that generally coincides with the opening 262. The input device may be held within the channel via a retaining mechanism such as screws, snaps, adhesives, press fit mechanisms, crush ribs and the like.

Figure 19:
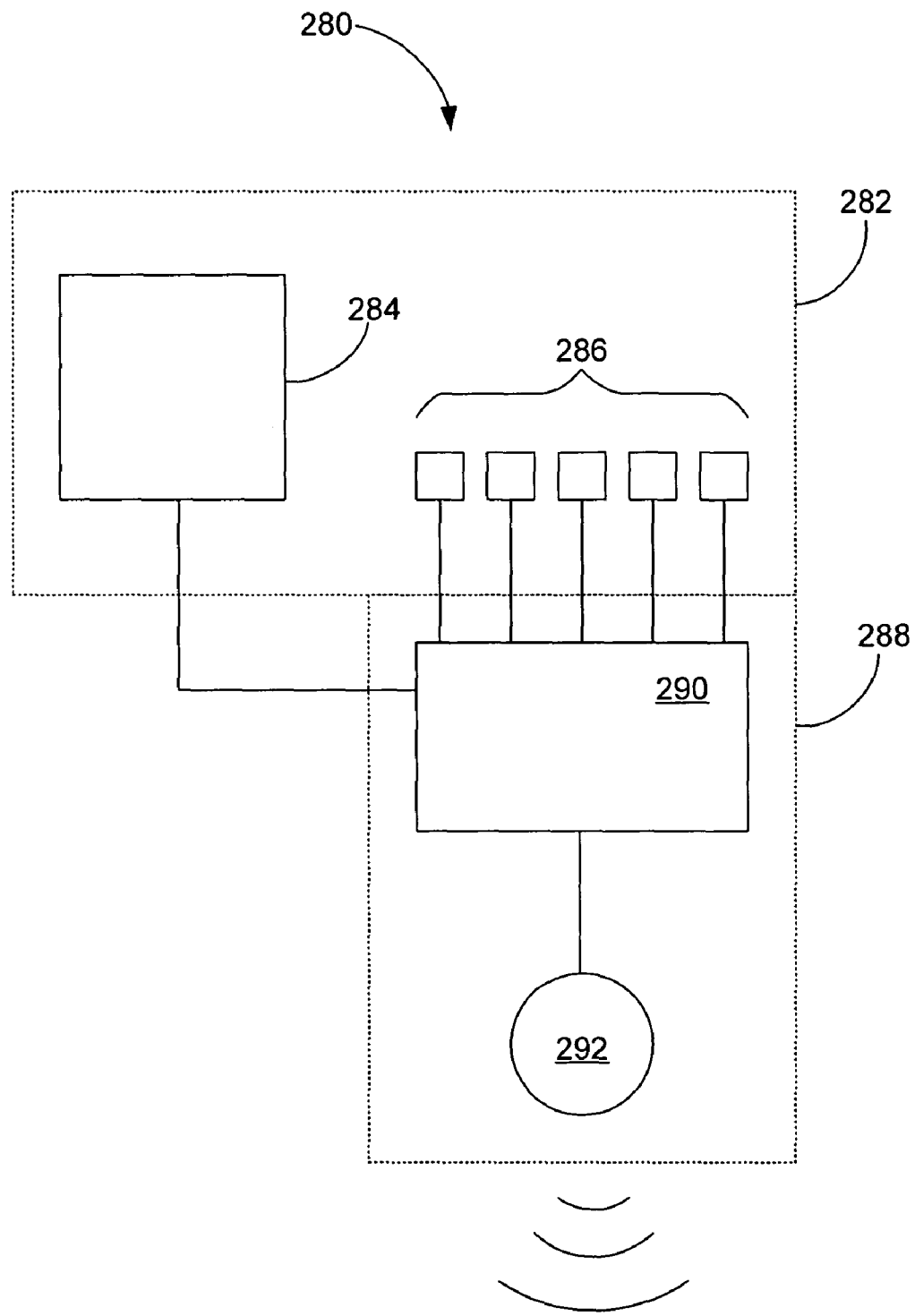
FIG. 19 is a simplified block diagram of a remote control, in accordance with one embodiment of the present invention.

FIG. 19 is a simplified block diagram of a remote control 280 incorporating an input device 282 therein, in accordance with one embodiment of the present invention. By way of example, the input device 282 may correspond to any of the previously described input devices. In this particular embodiment, the input device 282 corresponds to the input device shown in FIGS. 7-11, thus the input device includes a touch pad 284 and a plurality of switches 286. The touch pad 284 and switches 286 are operatively coupled to a wireless transmitter 288. The wireless transmitter 288 is configured to transmit information over a wireless communication link so that an electronic device having receiving capabilities may receive the information over the wireless communication link. The wireless transmitter 288 may be widely varied. For example, it may be based on wireless technologies such as FM, RF, Bluetooth, 802.11 UWB (ultra wide band), IR, magnetic link (induction) and/or the like. In the illustrated embodiment, the wireless transmitter 288 is based on IR. IR generally refers wireless technologies that convey data through infrared radiation. As such, the wireless transmitter 288 generally includes an IR controller 290. The IR controller 290 takes the information reported from the touch pad 284 and switches 286 and converts this information into infrared radiation as for example using a light emitting diode 292.

Figure 20A:
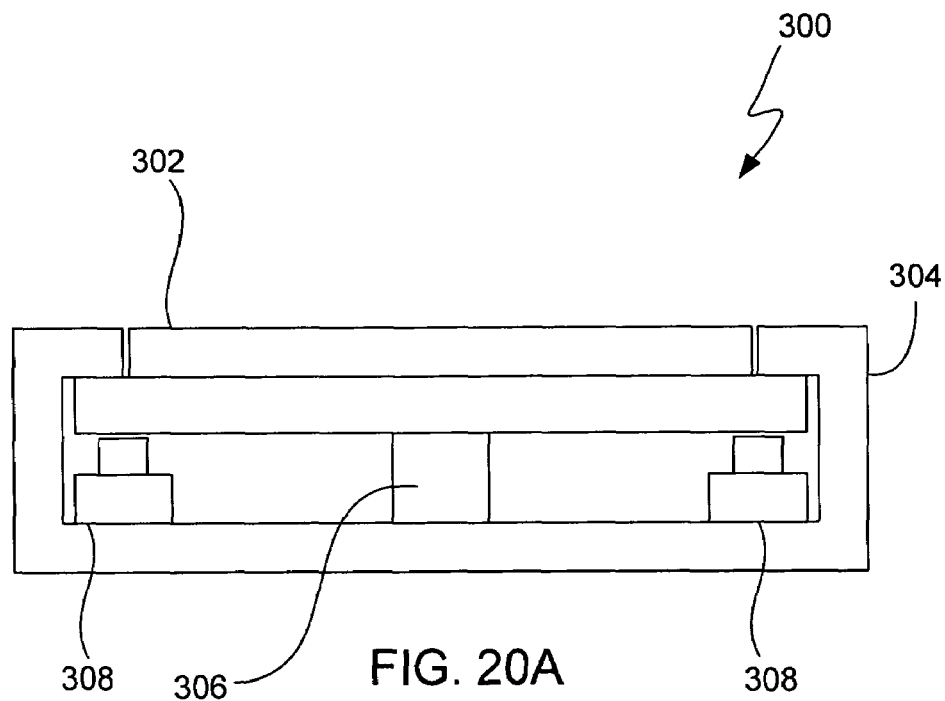
FIGS. 20A and 20B are side elevation views, in cross section of an input device, in accordance with an alternate embodiment of the present invention.
Figure 20B:
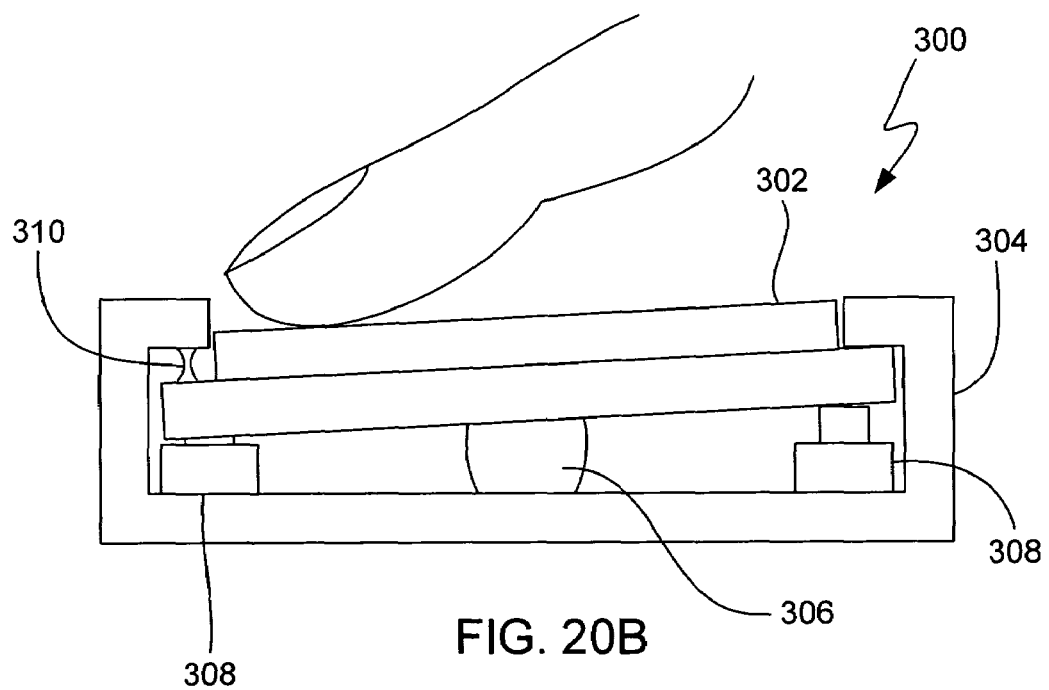

FIGS. 20A and 20B are diagrams of an input device 300, in accordance with an alternate embodiment of the present invention. This embodiment is similar to those shown in FIGS. 5-12, however instead of relying on a spring component of a switch, the input device 300 utilizes a separate spring component 306. As shown, the input device 300 includes a touch pad 302 containing all of its various layers. The touch pad 302 is coupled to a frame 304 or housing of the input device 300 via the spring component 306. The spring component 306 (or flexure) allows the touch pad 302 to pivot in multiple directions when a force is applied to the touch pad 302 thereby allowing a plurality of button zones to be created. The spring component 306 also urges the touch pad 302 into an upright position similar to the previous embodiments. When the touch pad 302 is depressed at a particular button zone (overcoming the spring force), the touch pad 302 moves into contact with a switch 308 positioned underneath the button zone of the touch pad 302. Upon contact, the switch 308 generates a button signal. The switch 308 may be attached to the touch pad 302 or the housing 304. In this embodiment, the switch 308 is attached to the housing 302. In some cases, a seal 310 may be provided to eliminate crack and gaps found between the touch pad 302 and the housing 304. The spring component 306 may be widely varied. For example, it may be formed from one or more conventional springs, pistons, magnets or compliant members. In the illustrated embodiment, the spring component 306 takes the form of a compliant bumper formed from rubber or foam.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A portable media device, comprising:
    a housing, and
    an input device comprising a touchpad associated with the housing, the touchpad configured to receive rotational inputs and capable of a gimbal action relative to the housing, wherein the gimbal action of the touchpad is configured to enable the touchpad to float relative to the housing while being constrained thereto and to enable the touchpad to move perpendicular relative to a surface of the housing when an input surface of the touchpad is parallel to the surface of the housing, thereby enabling the touchpad to move in multiple degrees of freedom relative to the housing, wherein each of the multiple degrees of freedom is associated with a function of the device and wherein the gimbal action of the touchpad enables a user of the portable media device to make a selection.

2. The portable media device of claim 1, wherein the portable media device comprises a media player.

3. The portable media device of claim 2, wherein an input surface of the touchpad is substantially co-planer with an external surface of the housing.

4. The portable media device of claim 1, wherein the touchpad comprises a plurality of spatially distinct zones, each of the zones having a corresponding indicator for generating a distinct user input signal when the touchpad is depressed in the region of the input zone.

5. The portable media device of claim 4, wherein the touchpad comprises at least four spatially distinct zones.

6. The portable media device of claim 1, wherein the touchpad is based on a polar coordinate system.

7. The portable media device of claim 1, wherein the touchpad is circular.

8. The portable media device of claim 1, wherein the selection comprises a selection for a media file.

9. The portable media device of claim 1, wherein the housing defines a space and wherein the touchpad and the housing are configured to enable the touchpad to float within the space of the housing.

10. The portable media device of claim 1, wherein the touchpad is configured to enable one or more clicking actions.

11. A portable media device, comprising:
    a housing, and
    an input device associated with the housing, the input device configured to gimbal to enable the input device to float relative to the housing while being constrained thereto and to enable the touchpad to move perpendicular relative to a surface of the housing when an input surface of the touchpad is parallel to the surface of the housing, thereby enabling the input device to move in multiple degrees of freedom relative to the housing and to receive a rotational input from a user, wherein the input device comprises a plurality of spatially distinct zones, each of the zones having a corresponding indicator for generating a distinct user input signal when the input device is depressed in the region of the zone, wherein each of the multiple degrees of freedom is associated with a function of the device and wherein the gimbal action of the input device enables a user of the portable media device to make a selection.

12. The portable media device of claim 11, wherein the portable media device comprises a media player.

13. The portable media device of claim 11, wherein the input device comprises a touchpad.

14. The portable media device of claim 11, wherein the input device comprises at least four spatially distinct zones.

15. The portable media device of claim 11, wherein the input device is based on a polar coordinate system.

16. The portable media device of claim 11, wherein the input device is circular.

17. The portable media device of claim 11, wherein an input surface of the input device is substantially co-planer with an external surface of the housing.

18. The portable media device of claim 11, wherein the housing defines a space and wherein the input device and the housing are configured to enable the input device to float within the space of the housing.

19. The portable media device of claim 11, wherein the input device is configured to enable one or more clicking actions.

20. A portable media device, comprising:
a housing, and
an input device comprising a touchpad within the housing, the input device configured to gimbal to enable the input device to float relative to the housing while being constrained thereto and to enable the touchpad to move perpendicular relative to a surface of the housing when an input surface of the touchpad is parallel to the surface of the housing, thereby enabling the input device to move in multiple degrees of freedom relative to the housing and to receive a rotational input from a user, wherein the touchpad comprises at least a plurality of spatially distinct zones, each of the input zones having a corresponding indicator for generating a distinct user input signal when the input device is depressed in the region of the input zone, wherein each of the multiple degrees of freedom is associated with a function of the device and wherein the gimbal action of the input device enables a user of the portable media device to make a selection.

21. The portable media device of claim 20, wherein the touchpad comprises at least four spatially distinct zones.

22. The portable media device of claim 20, wherein the touchpad is based on a Polar coordinate system.

23. The portable media device of claim 20, wherein the touchpad is circular.

24. The portable media device of claim 20, wherein an input surface of the touchpad is substantially co-planer with an external surface of the housing.

25. The portable media device of claim 20, wherein the housing defines a space and wherein the touchpad and the housing are configured to enable the touchpad to float within the space of the housing.

26. The portable media device of claim 20, wherein the touchpad is configured to enable one or more clicking actions.

27. A portable media device, comprising:
a housing,
an input device comprising a touch pad configured to gimbal to enable the input device to float relative to the housing while being constrained thereto and to enable the touchpad to move perpendicular relative to a surface of the housing when an input surface of the touchpad is parallel to the surface of the housing, thereby enabling the input device to move in multiple degrees of freedom relative to the housing, the touch pad enabling rotational user input comprising continuous actuation by circular motion of a finger rotated through 360 degrees of rotation, the touch pad comprising multiple independent, spatially distinct zones, each zone being moveable relative to the housing to implement a function associated with the zone, wherein each of the multiple degrees of freedom is associated with a function of the device and wherein the gimbal action of the input device enables a user of the portable media device to make a selection.

28. The portable media device of claim 27, wherein the housing comprises a frame, wherein the frame defines a space and wherein the touchpad and the frame are configured to enable the touchpad to float within the space of the frame.

29. The portable media device of claim 27, wherein the touchpad is configured to enable one or more clicking actions.

* * * * *